US008305665B2

(12) United States Patent (10) Patent No.: US 8,305,665 B2
Sakamoto et al. (45) Date of Patent: Nov. 6, 2012

(54) IMAGE PROCESSING APPARATUS, IMAGE FORMING SYSTEM, IMAGE PROCESSING METHOD AND COMPUTER READABLE MEDIUM

(75) Inventors: Masaomi Sakamoto, Kanagawa (JP);
Yoshiharu Hibi, Kanagawa (JP);
Ryouichi Satoh, Kanagawa (JP);
Toshifumi Takahira, Kanagawa (JP);
Pauvi Sulistio, Kanagawa (JP);
Kazuyuki Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 436 days.

(21) Appl. No.: 12/627,916

(22) Filed: Nov. 30, 2009

(65) Prior Publication Data
US 2010/0321747 A1 Dec. 23, 2010

(30) Foreign Application Priority Data
Jun. 18, 2009 (JP) ................................ 2009-145646

(51) Int. Cl.
*G03F 3/08* (2006.01)
(52) U.S. Cl. ............ 358/518; 358/1.9; 347/19; 356/421
(58) Field of Classification Search .................. 358/1.9; 347/19; 356/421
See application file for complete search history.

(56) References Cited

U.S. PATENT DOCUMENTS

| | | | |
|---|---|---|---|
| 5,781,206 A * | 7/1998 | Edge ................................ 347/19 |
| 5,859,933 A * | 1/1999 | Sasanuma et al. ............. 382/275 |
| 6,178,007 B1 * | 1/2001 | Harrington ..................... 358/1.9 |
| 6,204,873 B1 * | 3/2001 | Shimazaki ..................... 347/172 |
| 6,243,542 B1 * | 6/2001 | Fujimoto et al. ................ 399/49 |
| 6,766,051 B2 * | 7/2004 | Klassen et al. ................ 382/162 |
| 7,206,100 B2 * | 4/2007 | Namikata ..................... 358/3.23 |
| 7,365,878 B2 * | 4/2008 | Nakagawa ..................... 358/1.9 |
| 7,385,739 B2 * | 6/2008 | Ohga et al. .................... 358/518 |
| 7,583,420 B2 * | 9/2009 | Namikata ..................... 358/518 |
| 7,646,507 B2 * | 1/2010 | Ono .............................. 358/1.9 |
| 2002/0051131 A1 * | 5/2002 | Ohkubo ........................ 356/421 |
| 2004/0114157 A1 * | 6/2004 | Linder et al. .................. 358/1.9 |
| 2005/0088476 A1 * | 4/2005 | Johnson ......................... 347/19 |
| 2005/0206928 A1 * | 9/2005 | Itagaki ........................... 358/1.9 |
| 2007/0052987 A1 * | 3/2007 | Jung ............................... 358/1.9 |
| 2007/0058186 A1 * | 3/2007 | Tanaka .......................... 358/1.9 |
| 2008/0218778 A1 * | 9/2008 | Kusunoki ...................... 358/1.9 |
| 2009/0073474 A1 * | 3/2009 | Saito et al. .................... 358/1.9 |
| 2009/0225340 A1 * | 9/2009 | Hatori .......................... 358/1.9 |

FOREIGN PATENT DOCUMENTS
JP 2005-184144 A 7/2005
* cited by examiner

*Primary Examiner* — King Poon
*Assistant Examiner* — Ted Barnes
(74) *Attorney, Agent, or Firm* — Sughrue Mion, PLLC

(57) ABSTRACT

The image processing apparatus includes: a color conversion unit color-converting an image signal of a first color space into that of a second color space by using a color conversion characteristic defining a correspondence relationship between the image signals of the first and second color spaces; an adjustment unit adjusting the image signal of the second color space, in accordance with a change in the color conversion characteristic; a correction unit correcting a conversion factor group for adjustment used when the image signal of the second color space is adjusted; and a judgment unit judging whether the conversion factor group needs to be corrected, on the basis of a color measurement result of a second color sample group including color samples the number of which is smaller than that of color samples in a first color sample group on which color measurement is performed to create the conversion factor group.

12 Claims, 10 Drawing Sheets

IMAGE PROCESSING APPARATUS, IMAGE FORMING SYSTEM, IMAGE PROCESSING METHOD AND COMPUTER READABLE MEDIUM

CROSS REFERENCE TO RELATED APPLICATIONS

This application is based on and claims priority under 35 USC §119 from Japanese Patent Application No. 2009-145646 filed Jun. 18, 2009.

BACKGROUND

1. Technical Field

The present invention relates to an image processing apparatus, an image forming system, an image processing method and a computer readable medium storing a program.

2. Related Art

In general, in an image forming apparatus such as a color printer, since a color space of image signals to be inputted (input color space) and a color space used for image forming processing (output color space) are different from each other, color conversion processing for converting the color space is performed. This color conversion processing is generally performed on the basis of a correspondence relationship (table) between colors in the input color space and colors in the output color space. The colors in the input color space and the colors in the output color space are associated with each other in advance. This correspondence relationship may be changed by, for example, a time-dependent factor in some cases.

SUMMARY

According to an aspect of the present invention, there is provided an image processing apparatus including: a color conversion unit that color-converts an image signal of a first color space into an image signal of a second color space by using a color conversion characteristic defining a correspondence relationship between the image signal of the first color space and the image signal of the second color space; an adjustment unit that adjusts the image signal of the second color space color-converted by the color conversion unit, in accordance with a change in the color conversion characteristic; a correction unit that corrects a conversion factor group for adjustment, the conversion factor group used when the image signal of the second color space is adjusted by the adjustment unit; and a judgment unit that judges whether or not the conversion factor group for adjustment needs to be corrected by the correction unit, on the basis of a result of color measurement of a second color sample group including color samples the number of which is smaller than the number of color samples included in a first color sample group on which color measurement is performed to create the conversion factor group for adjustment to be set in the adjustment unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below in detail with reference to the accompanying drawings.

<Description of Entire Image Forming Apparatus>

Figure 1:
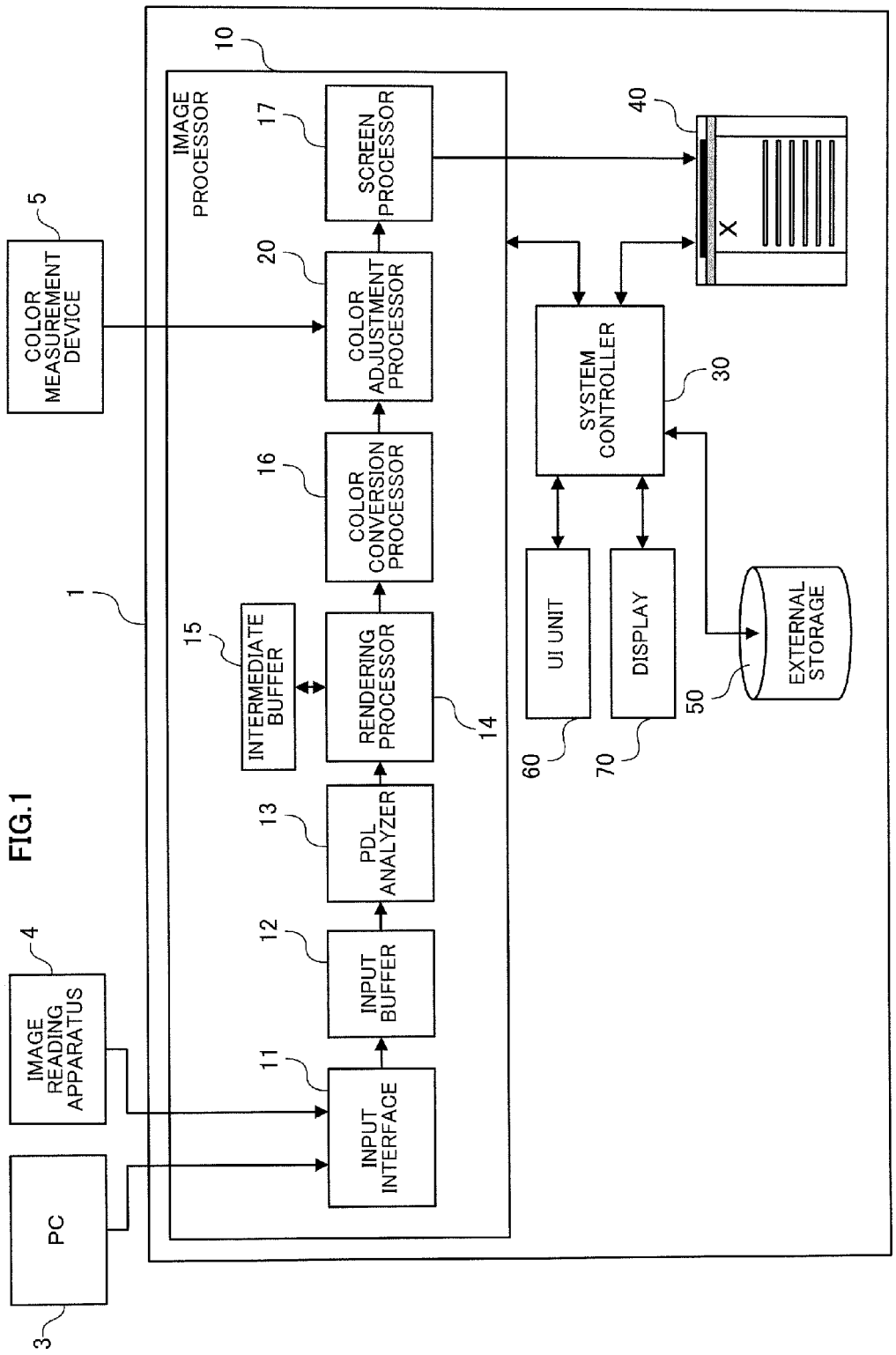
FIG. 1 is a diagram showing a configuration example of an image forming system including an image processor to which the exemplary embodiments are applied.

FIG. 1 is a diagram showing a configuration example of an image forming system 1 including an image processor 10 to which the exemplary embodiments are applied.

As shown in FIG. 1, the image forming system 1 includes the image processor 10 and a system controller 30. The image processor 10 is an example of an image processing unit (image processing apparatus) that is, for example, a digital color printer, and that performs image processing on image data inputted from an external apparatus such as a personal computer (PC) 3 or an image reading apparatus 4. The system controller 30 controls operation of the entire image forming system 1. Moreover, the image forming system 1 includes an external storage 50 and an image formation function unit 40. The external storage 50 stores therein various programs such as an operating system (OS) and application software to be executed by the system controller 30. The image formation function unit 40 is an example of an image forming unit that performs image formation on the basis of image data (an image signal) of each color component. For the image formation function unit 40, an image forming engine employing an electrophotographic method, an ink-jet method or the like is used, for example.

Furthermore, the image forming system 1 includes a user interface (UI) unit 60 and a display 70. The UI unit 60 is an example of a receiving unit that receives an input of an instruction from a user (for example, a user or an administrator of the image forming system 1). The display 70 is an example of a notifying unit that notifies a user of various kind of information.

<Description of Image Processor>

The image processor 10 includes an input interface 11, an input buffer 12 and a PDL analyzer 13. The input interface 11 is an example of an image data receiving unit that receives an input of image data from an external device such as the PC 3 or the image reading apparatus 4, for example. The input buffer 12 temporarily stores the image data received by the input interface 11. The PDL analyzer 13 analyzes the image data in a page description language (PDL) and then generates intermediate data. Moreover, the image processor 10 includes a rendering processor 14 and an intermediate buffer 15. The rendering processor 14 expands (renders) the intermediate data generated by the PDL analyzer 13 as image data for printing that is expressed by a group of pixels (such as a raster image data). The intermediate buffer 15 is used as a working area in rendering processing performed by the rendering processor 14.

Furthermore, the image processor 10 includes a color conversion processor 16, a color adjustment processor 20 and a screen processor 17. The color conversion processor 16 is an example of a color conversion unit that performs color conversion processing (color correction processing) on the rendered image data to generate image data of a color specification system suitable for print processing (for example, image data of a CMYK color space). The color adjustment processor 20 performs color adjustment processing (calibration) on the image data thus subjected to the color conversion processing by the color conversion processor 16, to compensate deterioration with age in color reproducibility and the like. The screen processor 17 performs screen processing on the image data thus subjected to the color conversion and color adjustment processing.

In the image processor 10, the input interface 11 receives image data outputted from the PC 3, the image reading apparatus 4 or the like, for example, and then transmits the image data to the input buffer 12. The input buffer 12 temporarily stores the image data acquired from the input interface 11, and outputs the image data to the PDL analyzer 13. The PDL analyzer 13 acquires the image data from the input buffer 12, and then generates, from the acquired image data, intermediate data for one page, for example. Thereafter, the PDL analyzer 13 outputs the generated intermediate data to the rendering processor 14. The rendering processor 14 performs rendering processing on the intermediate data acquired from the PDL analyzer 13, and then outputs the rendered raster image data (image data constituted of an array of a group of pixels) to the color conversion processor 16.

The color conversion processor 16 converts the acquired raster image data to color signals in an output color space (a second color space: a CYMK color space, for example) to be used in the print processing by the image formation function unit 40. Further, the color adjustment processor 20 performs color adjustment processing on the raster image data converted into the color signals in the output color space. Then, the color adjustment processor 20 outputs the raster image data thus subjected to the color conversion and color adjustment processing, to the screen processor 17.

The screen processor 17 performs screen processing on the multi-valued raster image data acquired from the color adjustment processor 20, and thereby generates binary image data (1-bit image data). Specifically, on the basis of the raster image data, which is multi-valued image information having a grey scale, the screen processor 17 generates binary image data spuriously representing the density of a halftone image by using colored dots, called halftone dots, each having a corresponding size. Then, the screen processor 17 outputs the generated binary image data to the image formation function unit 40.

Here, the image processor 10 may be integrally configured with the system controller 30, the image formation function unit 40 and the like, or may be configured separately from the system controller 30, the image formation function unit 40 and the like. In the case of configuring the image processor 10 separately, the image processor 10 is connected to each of the system controller 30, the image formation function unit 40 and the like via a network such as a local area network (LAN), a wide area network (WAN) or the Internet, for example. A communication line forming such a network may be a telephone line, a satellite communication line (a space transmission line of digital satellite broadcasting, for example) or the like.

Figure 2:
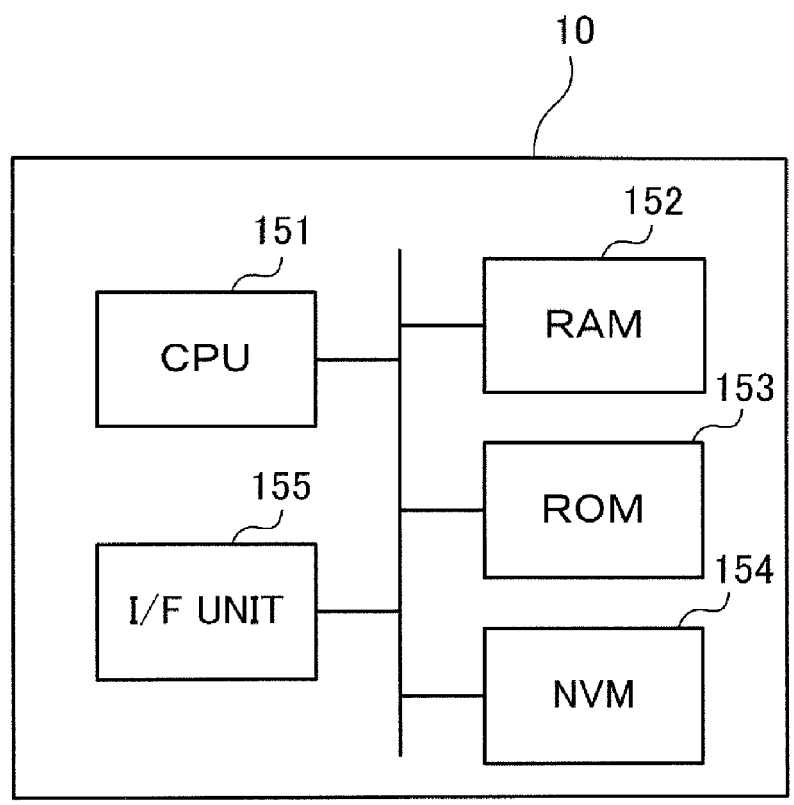
FIG. 2 is a block diagram showing an internal configuration of the image processor.

Here, FIG. 2 is a block diagram showing an internal configuration of the image processor 10. As shown in FIG. 2, for processing image data, the image processor 10 is provided with a CPU 151, a RAM 152, a ROM 153, a non-volatile memory (NVM) 154, and interface (I/F) unit 155. The CPU 151 executes digital calculation processing in accordance with a processing program set in advance. The RAM 152 is used as a working memory or the like for the CPU 151. The ROM 153 stores therein various setting values used in the processing in the CPU 151. The non-volatile memory (NVM) 154 such as a flash memory is a rewritable, holds data even in a case where the power supply is terminated, and is backed up by a battery. The I/F unit 155 controls an input and an output of signals with each of configuration units such as external devices including the PC 3, a colorimeter 5 and the like connected to the image processor 10, the system controller 30, the image formation function unit 40 and the like.

The CPU 151 reads the processing program from the external storage 50 and loads it into the main memory (RAM 152), and achieves a function of each of the functional units such as the PDL analyzer 13, the rendering processor 14, the color conversion processor 16, the color adjustment processor 20, the screen processor 17 and the like.

It should be noted that, as another provision method on this processing program, the program may be provided while being prestored in the ROM 153, and be loaded into the RAM 152. In addition, when an apparatus is provided with a rewritable ROM 153 such as an EEPROM, only this program may be installed in the ROM 153 after the CPU 151 is set, and then may be loaded into the RAM 152. Moreover, this program may also be transmitted to the image processor 10 through a network such as the Internet and then installed in the ROM 153 of the image processor 10, and further loaded into the RAM 152. In addition, the program may be loaded into the RAM 152 from an external recording medium such as a DVD-ROM, a flash memory or the like.

First Exemplary Embodiment

Description of Color Adjustment Processor

Next, a description will be given of a color adjustment processor 20 according to an exemplary embodiment included in the above-described image processor 10. In the first exemplary embodiment, a description will be given of such a configuration that four colors, for example, cyan (C), magenta (M), yellow (Y) and black (K) would be used as color materials to be used in the image forming system 1 (image formation function unit 40).

Figure 3:
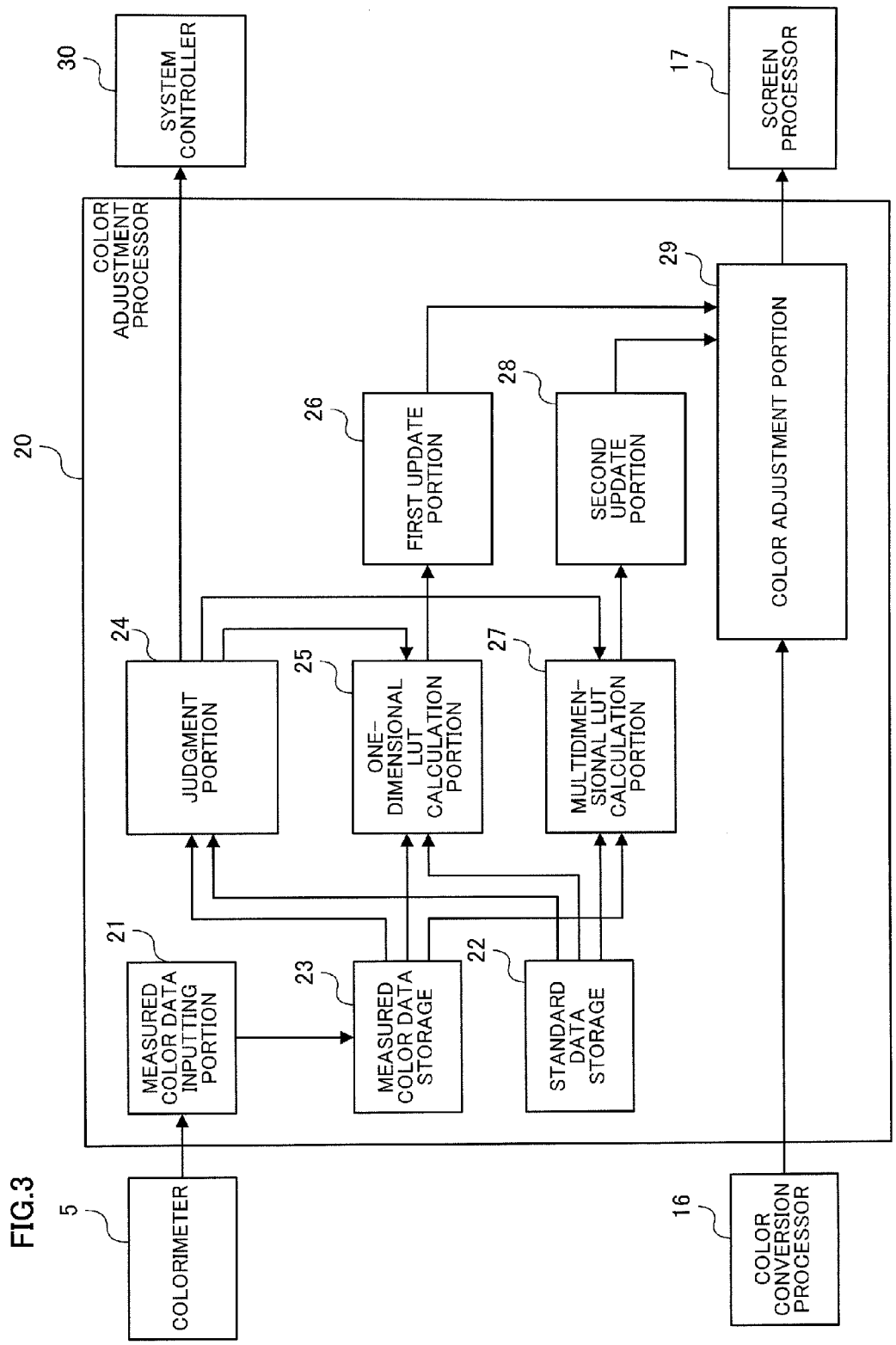
FIG. 3 is a block diagram showing a configuration of the color adjustment processor of the first exemplary embodiment.

FIG. 3 is a block diagram showing a configuration of the color adjustment processor 20 of the first exemplary embodiment.

As shown in FIG. 3, the color adjustment processor 20 includes a measured color data inputting portion 21, and a standard data storage 22. The measured color data inputting portion 21 acquires measured color data generated by the colorimeter 5 (also see FIG. 1), from the colorimeter 5 that measures colors of various color samples (color chart). The standard data storage 22 is an example of a memory that stores a color coordinate data pair (standard data) that is used as a target in color conversion processing in the image forming system 1.

The standard data stored in the standard data storage 22 is formed of: color coordinate values (C, M, Y, K) in the output color space (the second color space: the CMYK color space, for example) of the image forming system 1 (image formation function unit 40); and color coordinate values (L*, a*, b*) in a device-independent color space, which is, for example, a L*a*b* color space (a first color space), as an input color space corresponding to the output color space. The standard data provides ideal color conversion characteristics (a color conversion model) that are used as a target in the color conversion processing by the color conversion processor 16 of the image processor 10. The standard data is stored, as a default (standard setting), in the standard data storage 22 constituted of a nonvolatile memory or the like at the time of factory shipment, for example. Here, a configuration may be made such that a user would be allowed to create standard data in association with a sheet type to be used or the like, and to then store the standard data in the standard data storage 22 via the UI unit 60 or the like, for example.

Moreover, the color adjustment processor 20 includes a measured color data storage 23 that stores measured color data acquired by the measured color data inputting portion 21. The measured color data storage 23 stores measured color data generated by the colorimeter 5 in the event of calibration, and also keeps, without deleting, the measured color data thus stored, until the next calibration is completed.

Furthermore, the color adjustment processor 20 includes a judgment portion 24 as an example of a judgment unit. The judgment portion 24 judges, for example, necessity of changing a conversion factor group for adjustment (a "calibration profile," below) used when the color adjustment processor 20 performs calibration, on the basis of current and last measured color data on a judgment block 101 (see FIG. 4 described later) of a color chart 100 to be described later that is stored in the measured color data storage 23.

Here, the "conversion factor group for adjustment (calibration profile)" is a multidimensional (for example, four-dimensional) look-up table (LUT) that is used to perform color adjustment on raster image data (C, M, Y, K) subjected to the color conversion by the color conversion processor 16, and to thereby obtain "(C, M, Y, K)->(Cm, Mm, Ym, Km)."

The judgment portion 24 acquires, from the measured color data storage 23, the measured data on the judgment block 101 obtained in the current color measurement and the measured data on the judgment block 101 obtained in the last color measurement. Then, the judgment portion 24 judges whether or not to update the calibration profile to be used in color adjustment processing, by comparing the current measured data and the last measured data thus acquired. Further, in the event of an update of the calibration profile, the judgment portion 24 judges whether to perform an update of the calibration profile by using a one-dimensional LUT as an example of a conversion factor group or to recreate the entire calibration profile and obtain a new calibration profile. Thereafter, the judgment portion 24 notifies a one-dimensional LUT calculation portion 25, a multidimensional LUT calculation portion 27 and the system controller 30 of results of the judgments on the update of the calibration profile.

The color adjustment processor 20 includes the one-dimensional LUT calculation portion 25 and the multidimensional LUT calculation portion 27. The one-dimensional LUT calculation portion 25 calculates a one-dimensional look-up table (a one-dimensional LUT) to be used for an update of a calibration profile, in accordance with the judgment result obtained by the judgment portion 24. The multidimensional LUT calculation portion 27 calculates a multidimensional (for example, four-dimensional) look-up table (a multidimensional LUT) as an example of a calibration profile, in accordance with the judgment result obtained by the judgment portion 24.

Furthermore, the color adjustment processor 20 includes a color adjustment portion 29, a first update portion 26 and a second update portion 28. The color adjustment portion 29 is an example of an adjustment unit that performs color adjustment processing on the image data (image signal) subjected to the color conversion processing by the color conversion processor 16, by using a calibration profile. The first update portion 26 updates the calibration profile set in the color adjustment portion 29, by using a one-dimensional LUT calculated by the one-dimensional LUT calculation portion 25. The second update portion 28 updates the calibration profile set in the color adjustment portion 29, by using the multidimensional LUT calculated by the multidimensional LUT calculation portion 27.

Each of the pair of the one-dimensional LUT calculation portion 25 and the first update portion 26 and the pair of the multidimensional LUT calculation portion 27 and the second update portion 28 functions as a correction unit that corrects the conversion factor group for adjustment (the calibration profile).

Description of Color Chart

Color Samples

In the following, a description will be given of a color chart (color sample groups) used when the color adjustment processor 20 of the first exemplary embodiment of the present invention updates a calibration profile.

When the UI unit 60, for example, receives, from a user, an operation input that instructs an update of a calibration profile, the system controller 30 transmits a control signal for an instruction to print a color chart, to the image formation function portion 40. Thereby, the image formation function portion 40 prints a color chart constituted of: a judgment block as an example of a second color sample group including color samples (patches) used when the judgment portion 24 performs judgment on an update of a calibration profile; a one-dimensional LUT block as an example of a third color sample group including patches used for calculating a one-dimensional LUT to be used for an update of a calibration profile; and a multidimensional LUT block (four-dimensional LUT block) as an example of a first color sample group including patches to be used for an update of an entire calibration profile.

Figure 4:
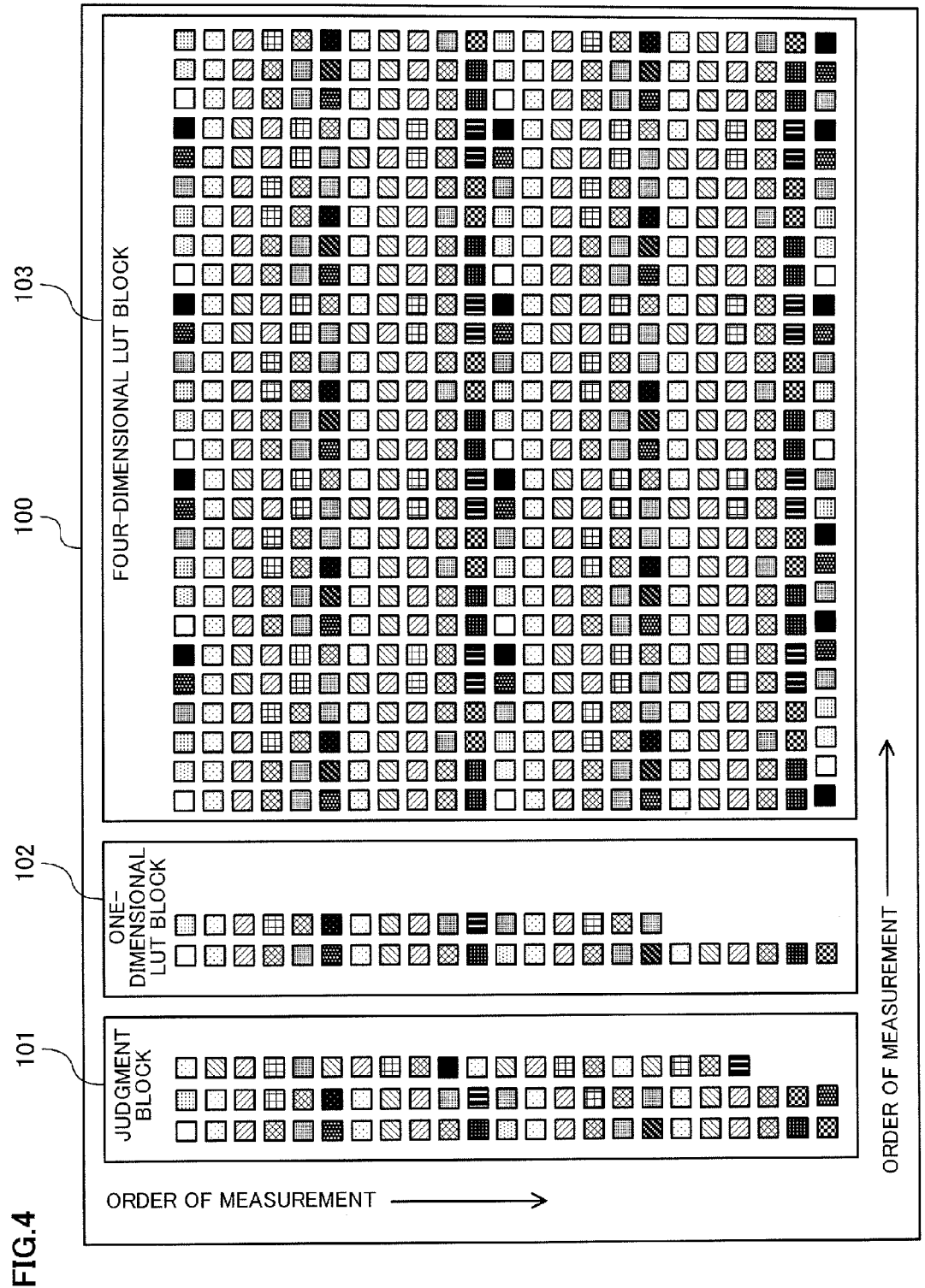
FIG. 4 is a view showing an example of the color chart printed by the image formation function portion.

FIG. 4 is a view showing an example of the color chart 100 printed by the image formation function portion 40.

As shown in FIG. 4, the color chart 100 printed by the image formation function portion 40 includes the judgment block 101, a one-dimensional LUT block 102 and a four-dimensional LUT block 103.

In the judgment block 101, a total of 66 patches are printed. The patches include, for example: 40 patches obtained by printing of each of the color components (C component, M component, Y component and K component) which are primary colors of a CMYK color space serving as the output color space, by the step of 10%; 15 patches obtained by printing of each of blue (B), green (G) and red (R) which are each a secondary color generated by mixing two of the color components of the CMYK color space, by the step of 20%; 5 patches obtained by printing of a grey tone (monotone) which is a tertiary color generated by mixing three color components (C component, M component and Y component), by the step of 20%; 5 patches obtained by printing of a grey tone which is a quartic color generated by mixing four color components (C component, M component, Y component and K component), by the step of 20%; and 1 patch in white.

Moreover, in the one-dimensional LUT block 102, 40 patches are printed. The patches include those excluding the 40 patches formed in the judgment block 101 (those printed by the step of 10%) among 80 patches obtained by printing of each of the color components (C component, M component, Y component and K component) which are primary colors of a CMYK color space, by the step of 5%.

Furthermore, in the four-dimensional LUT block 103, 580 patches are printed. The patches include those excluding the 45 patches formed in the judgment block 101 among a total of 625 (=5^4) patches of secondary to quartic colors obtained by mixing of the color components (C component, M component, Y component and K component) of a CMYK color space by changing each of the color components by the step of 20%.

The judgment block 101 of the color chart 100 is to be used by the judgment portion 24 for judging whether or not to update a calibration profile, and also whether to update the calibration profile by using a one-dimensional LUT or to recreate the entire calibration profile and obtain a new calibration profile. Accordingly, in the judgment block 101, the minimum number of patches required to judge a tendency of the amount of changes in each color coordinate value from the last color measurement (update of a calibration profile) to the current color measurement is formed.

Here, in the judgment block 101, the patches do not need to be formed at regular intervals in the CMYK color space, and may be formed at irregular intervals as long as the judgment on a tendency of the amount of changes in each color coordinate value is performable.

Meanwhile, in the one-dimensional LUT block 102, the necessary number of patches sufficient for calculating a one-dimensional LUT to be used to update a calibration profile is formed.

Moreover, in the four-dimensional LUT block 103, the certain number of patches that cover the entire CMYK color space, which is the output color space, is formed in order to update the entire calibration profile.

Description of Procedure for Update of Calibration Profile

When the color chart 100 illustrated in FIG. 4 is printed by the image formation function portion 40 in response to an input of an instruction to update a calibration profile by a user from the UI unit 60, the system controller 30 instructs, through the display 70, the user to measure the colors of the patches formed in the judgment block 101 of the color chart 100, by using the colorimeter 5. When the user measures, in response to the instruction, the colors of the patches formed in the judgment block 101, by using the colorimeter 5, the measured color data inputting portion 21 of the color adjustment processor 20 acquires measured color data obtained by the color measurement by the colorimeter 5.

If the user measures the colors of the patches in a wrong order by using the colorimeter 5 that is a handy type and operates manually, the system controller 30 displays an error indication on the display 70. Moreover, if the user measures the colors of the patches in the color chart 100 in a wrong arrangement direction, by using the colorimeter 5 that is a scan type and operates automatically, the system controller 30 also displays an error indication on the display 70. Thereby, the system controller 30 urges the user to measure the colors of the color chart 100 in a correct way.

The measured color data inputting portion 21 transfers, to the measured color data storage 23, color coordinate values (L*, a*, b*) in the L*a*b* color space which is the input color space, as measured color data on the patches that are formed in the judgment block 101 and measured in color by the colorimeter 5. Thereby, the measured color data storage 23 stores the measured color data on the patches that are formed in the judgment block 101 and are measured in color by the colorimeter 5 in the current color measurement, in addition to the measured color data obtained in the last calibration.

Then, when the measured color data measured in color by the colorimeter 5 is stored in the measured color data storage 23, the judgment portion 24 acquires the measured color data measured in the current color measurement and the measured color data measured in the last color measurement, from the measured color data storage 23.

The judgment portion 24 calculates, for each of the patches formed in the judgment block 101, a difference (color difference) between the measured data obtained in the current color measurement and the measured data obtained in the last color measurement. Moreover, the judgment portion 24 calculates, for example, an average value of the color differences in the measured color data on all the patches formed in the judgment block 101 (an "average color difference," below). Furthermore, the judgment portion 24 calculates an average value of the color differences in the measured color data on each color component (primary color) (an "average color difference of each primary color," below), and an average value of color differences in the measured data on each color generated by mixing of two or more color components (i.e., each of secondary colors, tertiary colors and quartic colors) (an "average color difference of each secondary or higher color").

Then, the judgment portion 24 performs judgment on a calibration profile on the basis of predetermined standards of the color differences thus calculated (the average color difference, the average color difference of each primary color and the average color difference of each secondary or higher color). For example, if the calculated average color difference is, for example, "1" or smaller, the judgment portion 24 determines not to update the calibration profile. Moreover, if the calculated average color difference of each primary color is "2" or smaller and the calculated average color difference of each secondary or higher color is "2" or smaller, the judgment portion 24 determines to update the calibration profile by using a one-dimensional LUT. Furthermore, if none of the measured color differences meet any of the above conditions, the judgment portion 24 determines to recreate the entire calibration profile and obtain a new calibration profile.

As described above, the judgment portion 24 calculates color differences between the measured data obtained in the current color measurement and the measured data obtained in the last color measurement, for each of the patches formed in the judgment block 101, for example. Then, on the basis of the calculated color differences of the measured data, the judgment portion 24 judges whether or not to update the calibration profile, whether to update the calibration profile by using a one-dimensional LUT or to recreate the entire calibration profile and obtain a new calibration profile. Thereby, it is found out that, on the basis of color measurement of the patches formed in the judgment block 101, an update of the calibration profile is not to be performed, only an update of the calibration profile using a one-dimensional LUT is necessary, or the like. Thus, the frequency of color measurement on the four-dimensional LUT block 103, which includes a large number of patches, is reduced.

In the first exemplary embodiment, the system controller 30 provides an instruction to measure the colors of the patches formed in the judgment block 101 of the color chart 100. However, the system controller 30 may provides an instruction to measure the colors of the patches formed in the one-dimensional LUT block 102 (monochromatic patches of each color component) in addition to those formed in the judgment block 101. This does not greatly increase a burden to be imposed on the user for color measurement since the number of patches formed in the one-dimensional LUT block 102 is extremely small compared with the four-dimensional LUT block 103, while improving the judgment accuracy.

Moreover, in the event of judgment on an update of a calibration profile, the judgment portion 24 may use a maximum value of the color differences of the patches formed in the judgment block 101, instead of the above-described average value of the color differences in the measured color data, or in addition to the average value of the color differences.

Another Example of Method of Judgment on Update of Calibration Profile

Alternatively, the judgment portion 24 may perform judgment on an update of a calibration profile by using the following judgment method.

Firstly, the judgment portion 24 acquires the standard data from the standard data storage 22. Then, the judgment portion 24 calculates color conversion characteristics ("inverse color conversion characteristics," below) from the input color space (L*a*b* color space) to the output color space (CMYK space), by using the standard data. In the calculation of the inverse color conversion characteristics, employed is a method of performing statistical processing such as regression analysis by adding a weight (weighting) to the standard data (color coordinate data pair), a method of performing interpolation processing by simply calculating a weighted average for the standard data, a method of performing statistical processing by using a neural network that has learnt the standard data, or the like. In such a case, in conversion from the color coordinate values (L*, a*, b*) of the three-dimensional L*a*b* color space to the color coordinate values (C, M, Y, K) of the four-dimensional CMYK color space, a unique solution is not determined due to a lack of known numbers. For this reason, calculation is performed under the conditions that "a primary color is converted to a primary color" and "a secondary color is converted to a secondary color," for example. Subsequently, the judgment portion 24 acquires, from the measured color data storage 23, measured color data (L*, a*, b*) on each of the patches formed in the judgment block 101, the measured color data (L*, a*, b*) obtained in the current color measurement. Moreover, the judgment portion 24 generates actual data pairs each formed of the acquired measured color data (L*, a*, b*) and corresponding one of actual data (Cm', 0, 0, 0), (0, Mm', 0, 0), (0, 0, Ym', 0) and (0, 0, 0, Km') of the respective patches formed in the judgment block 101. Then, by using the above-described inverse color conversion characteristics calculated on the basis of the standard data, the judgment portion 24 estimates each of color data (Cs, 0, 0, 0), (0, Ms, 0, 0), (0, 0, Ys, 0) and (0, 0, 0, Ks) corresponding to the measured color data (L*, a*, b*).

Thereby, the judgment portion 24 creates, for each color (primary color), a profile in which each of the estimated color data (Cs, 0, 0, 0), (0, Ms, 0, 0), (0, 0, Ys, 0) and (0, 0, 0, Ks) is associated with a corresponding one of the actual data (Cm', 0, 0, 0), (0, Mm', 0, 0), (0, 0, Ym', 0) and (0, 0, 0, Km') of each of the patches formed in the judgment block 101 (such a profile is called a "judgment profile," below). This judgment profile is constituted of one-dimensional look-up tables (one-dimensional LUTs) for respective primary colors, including "(Cs, 0, 0, 0)->(Cm', 0, 0, 0)," "(0, Ms, 0, 0)->(0, Mm', 0, 0)," "(0, 0, Ys, 0)->(0, 0, Ym', 0)," and "(0, 0, 0, Ks)->(0, 0, 0, Km')."

The judgment portion 24 calculates differences between adjustment values (Cm', 0, 0, 0), (0, Mm', 0, 0), (0, 0, Ym' 0) or (0, 0, 0, Km') of respective components (grids) of the created judgment profile and adjustment values of corresponding primary color components (grids) of the calibration profile set in the color adjustment portion 29. Then, on the basis of the calculated differences, the judgment portion 24 performs judgment on an update of the calibration profile.

The "adjustment values" here indicate adjusted image data (Cm, Mm, Ym, Km) in the calibration profile that is used for color adjustment to adjust the inputted image data (C, M, Y, K) to be "(C, M, Y, K)->(Cm, Mm, Ym, Km)."

Specifically, the judgment portion 24 obtains adjustment values of the calibration profile, the calibration values corresponding to the respective grids constituting the judgment profile. Then, the judgment portion 24 obtains differences between adjustment values of the respective grids of the judgment profile and adjustment values, corresponding to the grids, of the calibration profile. For example, for the color C, the judgment portion 24 obtains adjustment values (Cm, 0, 0, 0) for (Cin, 0, 0, 0) of the calibration profile. Then, the judgment portion 24 obtains a difference "Cm'-Cm" between the adjustment values (Cm', 0, 0, 0) for (Cs, 0, 0, 0) of the judgment profile and adjustment values (Cm, 0, 0, 0) for (Cin (=Cs), 0, 0, 0) in the calibration profile. The judgment portion 24 performs the same process for each of the colors M, Y and K.

Figure 5:
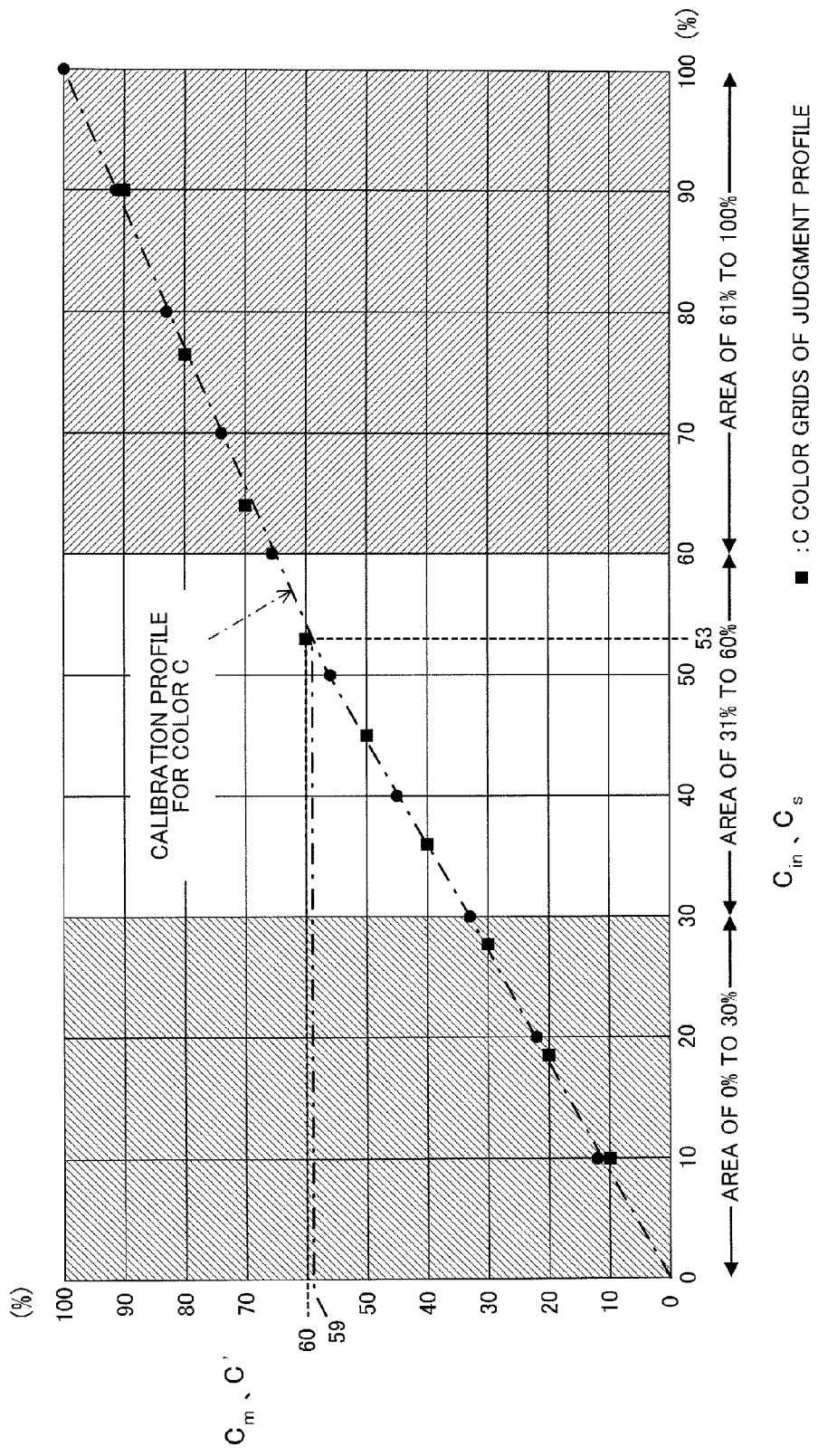
FIG. 5 is a graph showing the calibration profile for the color C (primary color) and adjustment values C' of the C color grids of the judgment profile.

FIG. 5 is an example of a graph showing the calibration profile for the color C (primary color) and adjustment values C' of the C color grids of the judgment profile. As shown in FIG. 5, for example, at Cin=Cs=53, the adjustment values (59, 0, 0, 0) of the calibration profile and the adjustment values (60, 0, 0, 0) of the judgment profile are associated with each other. Thus, the difference in this case is 60−59=1.

In this way, the judgment portion 24 calculates a difference between the adjustment value of the calibration profile and the adjustment value of the judgment profile, for each of the colors C, M, Y and K. The judgment portion 24 may judge whether or not to update the calibration profile, and whether to update the calibration profile by using a one-dimensional LUT or to recreate the entire calibration profile and obtain a new calibration profile, on the basis of the calculated difference.

In this case, a judgment criterion may be set by associating areas of each of the inputted image data Cin, Min, Yin and Kin respectively with calculated differences. Specifically, the inputted image data Cin, Min, Yin and Kin are each divided into three areas of 0% to 30%, 31% to 60% and 61% to 100%, for example (see FIG. 5). Then, a judgment criterion for an update of the calibration profile may be set in accordance with the differences in the respective areas.

For example, the judgment portion 24 may use the following criteria. Specifically, the judgment portion 24 judges not to update the calibration profile when the difference in the area 0% to 30% is "2" or smaller, the difference in the area 31% to 60% is "3" or smaller and the difference in the area 61% to 100% is "4" or smaller, for each of the colors C (Cin), M (Min), Y (Yin) and K (Kin) of the inputted image data.

Moreover, the judgment portion 24 judges to update the calibration profile by using a one-dimensional LUT when the difference in the area 0% to 30% is "3" or smaller, the difference in the area 31% to 60% is "4" or smaller and the difference in the area 61% to 100% is "6" or smaller. Furthermore, the judgment portion 24 judges to recreate the entire calibration profile and obtain a new calibration profile, when the differences do not meet any of the above conditions.

Further Example of Method of Judgment on Update of Calibration Profile

Alternatively, the judgment portion 24 may perform judgment on an update of a calibration profile by using the following judgment method.

Specifically, the judgment portion 24 creates a judgment profile not only for each primary color but also for each secondary or higher color (each of secondary colors, tertiary colors and quartic colors). Then, the judgment portion 24 obtains adjustment values of a calibration profile corresponding to each of grids constituting the judgment profile.

Thereby, the judgment portion 24 firstly obtains a distance (Euclidean distance), in a color space, between the adjustment values of each grid of the judgment profile for each secondary or higher color and the adjustment values of the corresponding calibration profile. For example, the judgment portion 24 obtains, for single inputted image data (Cin, Min, 0, 0), a distance D, in the color space, between the adjustment values (Cm2', Mm2', 0, 0) of the judgment profile and the adjustment values (Cm2, Mm2, 0, 0) of the calibration profile. In this case, calculated is $D=((Cm2'-Cm2)2+(Mm2'-Mm2)2)^{1/2}$.

Moreover, for each of the primary colors (Cin, 0, 0, 0) and (0, Min, 0, 0) each having the same color coordinate values as any of the color components (the color component C and the color component M) constituting the second or higher color, the judgment portion 24 obtains a difference between the adjustment values (Cm1', 0, 0, 0) of the judgment profile and the adjustment values (Cm1, 0, 0, 0) of the calibration profile, and a difference between the adjustment values (0, Mm1', 0, 0) of the judgment profile and the adjustment values (0, Mm1, 0, 0) of the calibration profile. In this case, a difference "Cm1'-Cm1" and a difference "Mm1'-Mm1" are obtained.

Then, by using the differences obtained for the respective areas (see FIG. 5) of each of the primary colors and secondary or higher colors, the judgment portion 24 performs judgment on an update of the calibration profile.

For example, the judgment portion 24 may use the following judgment criteria. Specifically, the judgment portion 24 firstly judges for the above-described secondary or higher color whether the distance $D=((Cm2'-Cm2)^2+(Mm2'-Mm2)^2)^{1/2}$ as the secondary or higher color is within a range set in advance for each area. Then, the judgment portion 24 judges that changes in the calibration profile are small, and determines not to update the calibration profile, when the distance D is "2" or smaller in the area 0% to 30%, "3" or smaller in the area 31% to 60%, and "4" or smaller in the area 61% to 100%, for example.

When the distance $D=((Cm2'-Cm2)^2+(Mm2'-Mm2)^2)^{1/2}$ is, for example, "3" or smaller in the area 0% to 30%, "4" or smaller in the area 31% to 60%, and "6" or smaller in the area 61% to 100%, the judgment portion 24 further judges whether or not the adjustment amount of the secondary or higher color and the adjustment amount of each corresponding primary color have the same tendency, in the following way. For example, the judgment portion 24 takes into consideration of the color components (the color component C and the color component M, here) constituting the secondary or higher color (the secondary color, here), and compares the difference for each of the color components in the case of converting (adjusting) the secondary or higher color and the difference in the case of converting (adjusting) the color component as a monochromatic color (primary color). Specifically, for each of the color components (the color component C and the color component M) constituting the secondary or higher color, the judgment portion 24 obtains a difference between the difference "Cm2'-Cm2" and the difference "Cm1'-Cm1", and a difference between the difference "Mm2'-Mm2" and the difference "Mm1'-Mm1," the differences "Cm2'-Cm2" and "Mm2'-Mm2" obtained respectively for the color components in the case of adjusting the secondary or higher color, the differences "Cm1'-Cm1" and "Mm1'-Mm1" obtained in the case of adjusting each of the color components as a primary color. In this case, a difference $\Delta C$ for the color component C="Cm2'-Cm2"-"Cm1'-Cm1" and a difference $\Delta M$ for the color component M="Mm2'-Mm2"-"Mm1'-Mm1" are obtained.

Then, if both of the difference •C and the difference •M are within "+/−2" in all the areas (0% to 100%), the judgment portion 24 judges that the adjustment amount of the secondary or higher color and the adjustment amount of each of the primary colors have the same tendency, and hence judges that an update of the calibration profile using a one-dimensional LUT is performable without any problem. Accordingly, the judgment portion 24 determines to update the calibration profile by using a one-dimensional LUT.

If none of these conditions are met, the judgment portion 24 determines to recreate the entire calibration profile and obtain a new calibration profile.

Description of Case of Performing No Update of Calibration Profile

Subsequently, when determining not to update the calibration profile, on the basis of the above-described judgment criterion, the judgment portion 24 notifies the system controller 30 of the determination. Upon receipt of the notification that no update of the calibration profile is to be performed, the system controller 30 displays, on the display 70, that the calibration profile does not need to be updated and hence color measurement of the color chart 100 by the colorimeter 5 is not needed. With this display, the user stops color measurement of the patches by the colorimeter 5, the patches formed in the one-dimensional LUT block 102 and the four-dimensional LUT block 103, i.e., all the blocks excluding the judgment block 101.

As described above, in the image forming system 1 of the first exemplary embodiment, it is found out that no update of the calibration profile is needed, on the basis of the color measurement of the judgment block 101 of the color chart 100. Hence, when the user uses, for example, the colorimeter 5 that is a handy type and operates manually, the number of operation steps to be performed by the user for the color measurement is reduced.

Description of Case in which Update of Calibration Profile Using One-Dimensional LUT is Performed Subsequently, when determining to update the calibration profile by using a one-dimensional LUT, on the basis of the above-described judgment criteria, the judgment portion 24 notifies the calibration controller 30 and the one-dimensional LUT calculation portion 25 of the determination. Upon receipt of the notification that an update of the calibration profile using a one-dimensional LUT is to be performed, the calibration controller 30 displays, on the display 70, an instruction to perform color measurement on the one-dimensional LUT block 102 of the color chart 100 by the colorimeter 5. In accordance with the instruction, the user measures the colors of the patches formed in the one-dimensional LUT block 102 by using the colorimeter 5.

Thus, in the image forming system 1 of the first exemplary embodiment, it is found out that, on the basis of the color measurement performed on the judgment block 101 of the color chart 100, an update using the measured color data of the one-dimensional LUT block 102 is sufficient for the update of the calibration profile. Accordingly, if the user uses, for example, the colorimeter 5 that is a handy type and operates manually, the number of operation steps to be performed by the user for the color measurement is reduced.

Upon receipt of the notification that an update of the calibration profile using a one-dimensional LUT is to be performed, the one-dimensional LUT calculation portion 25 acquires, from the measured color data storage 23, measurement data (L1*, a1*, b1*) on each of the patches formed in the judgment block 101 and the one-dimensional LUT block 102, the measurement data (L1*, a1*, b1*) obtained in the current color measurement by the colorimeter 5. Moreover, the one-dimensional LUT calculation portion 25 acquires, from the measured color data storage 23, measurement data (L2*, a2*, b2*) on each of the patches formed in the judgment block 101 and the one-dimensional LUT block 102, the measurement data (L2*, a2*, b2*) obtained in the color measurement performed at the last calibration. Then, the one-dimensional LUT calculation portion 25 calculates a color difference between the current measured color data (L1*, a1*, b1*) and a blank sheet (L0*, a0*, b0*), and a color difference between the last measured color data (L2*, a2*, b2*) and the blank sheet (L0*, a0*, b0*). The color differences are Euclidean distances D1 and D2 (one-dimensional values) between the measured color data (L1*, a1*, b1*) and the blank sheet (L0*, a0*, b0*) and between the measured color data (L2*, a2*, b2*) and the blank sheet (L0*, a0*, b08) in the L*a*b* color space.

Thereby, the one-dimensional LUT calculation portion 25 creates data pairs each including: the color difference D1 or the color difference D2; and a color component value on the corresponding one of the patches (monochromatic patches of the color components) formed in the judgment block 101 and the one-dimensional LUT block 102. Specifically, the one-dimensional LUT calculation portion 25 creates data pairs (D1, C), (D1, M), (D1, Y) and (D1, K) of the measured color data obtained in the current color measurement, and data pairs (D2, C), (D2, M), (D2, Y) and (D2, K) of the measured color data obtained in the last color measurement. The characters C, M, Y and K here indicate actual data of the respective patches.

Then, on the basis of the data pairs (D1, C), (D1, M), (D1, Y) and (D1, K) for the current measured color data and the data pairs (D2, C), (D2, M), (D2, Y) and (D2, K) for the last measured color data of each of the patches, the one-dimensional LUT calculation portion 25 calculates, for each of the color components (primary colors), a correction curve showing a correspondence relationship between the corresponding one of the last adjustment values (Cm2, Mm2, Ym2, Km2) and the corresponding one of the current adjustment values (Cm1, Mm1, Ym1, Km1).

Specifically, the color difference D1 and the color difference D2 of each of the patches are different since the measured color data obtained in the last color measurement and the measured color data obtained in the current color measurement have different values although the actual data C, M, Y and K of the patch does not change. Accordingly, by associating the actual data C, M, Y and K of each of the patches with the last adjustment values (Cm2, Mm2, Ym2, Km2) and the current adjustment values (Cm1, Mm1, Ym1, Km1) in consideration of the color differences (D1 and D2) which are one-dimensional values, the last adjustment values (Cm2, Mm2, Ym2, Km2) and the current adjustment values (Cm1, Mm1, Ym1, Km1) are associated with each other. Thereby, the one-dimensional LUT calculation portion 25 calculates, for each of the color components (primary colors), a correction curve based on the last adjustment value and the corresponding current adjustment value thus associated with each other, by using interpolation operation, matching processing or the like.

Here, an example used here to calculate a correction curve (a one-dimensional LUT) is a method in which three-dimensional data, the L*a*b* color space here, is converted into one-dimensional data by obtaining color differences between the data and the blank sheet. However, the method of calculating a correction curve (a one-dimensional LUT) is not limited thereto. For example, when a colorimeter capable of measuring a density value at the same time as obtaining measured color values in the L*a*b* color space is used, the density values may be used to calculate a one-dimensional LUT, instead of the measured color values (L*, a*, b*).

Figure 6:
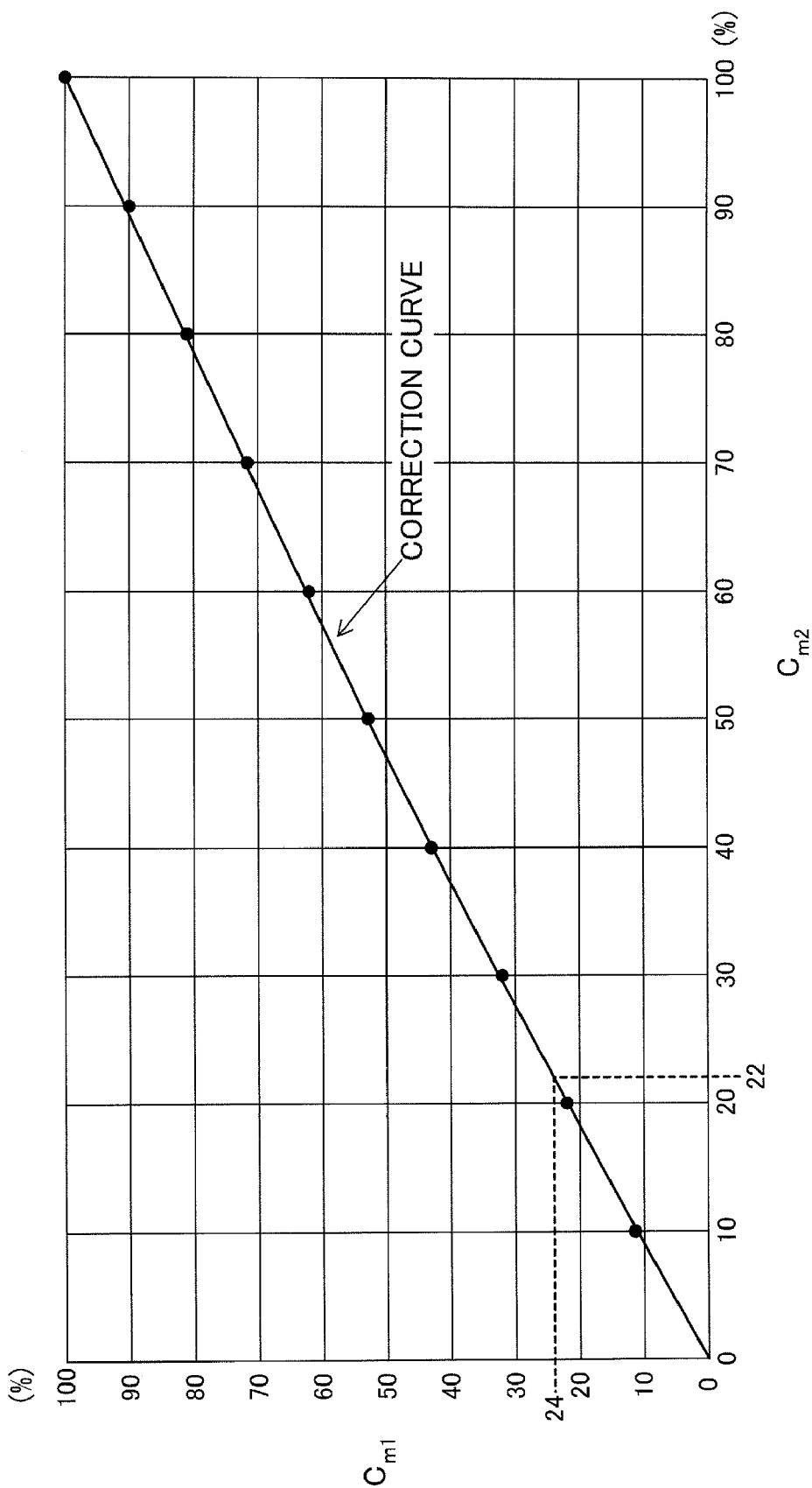
FIG. 6 is a graph illustrating a correction curve showing a correspondence relationship between a last adjustment value $C_{m2}$ and a current adjustment value $C_{m1}$ for the color component C, the correction curve calculated by using the color differences (D1, D2)

FIG. 6 is an example of a graph illustrating a correction curve showing a correspondence relationship between a last adjustment value Cm2 and a current adjustment value Cm1 for the color component C, the correction curve calculated by using the color differences (D1, D2). In the correction curve illustrated in FIG. 6, the last adjustment value Cm2=22 is associated with the current adjustment value Cm1=24, for example.

Thus, the one-dimensional LUT calculation portion 25 creates the correction curve illustrated in FIG. 6 as a one-dimensional LUT constituted of a combination of the last calibration value Cm2 (=1% to 100%) and the current adjustment value Cm1 (=1% to 100%) associated with the last adjustment value Cm2. The same process is performed for each of the color component M, the color component Y and the color component K.

Then, the one-dimensional LUT calculation portion 25 outputs the one-dimensional LUT created for each of the color components, to the first update portion 26.

The first update portion 26 corrects all the grids (primary color components, secondary color components, tertiary color components and quartic color components) constituting the calibration profile set in the color adjustment portion 29, by using one-dimensional LUTs of the respective color components acquired from the one-dimensional LUT calculation portion 25.

For example, assume that a first grid constituting a calibration profile generated in the last calibration is to adjust (Cin, Min, Yin, Kin)=(20, 30, 70, 20) to adjustment values) (Cm2, Mm2, Ym2, Km2)=(22, 28, 69, 22). In this case, for example, by using the one-dimensional LUT of the color component C illustrated in FIG. 6, the first update portion 26 corrects C2=22 to C1=24. Similarly, it is assumed here that the first update portion 26 corrects M2=28 to M1=30 by using a one-dimensional LUT of the color component M, Y2=69 to Y1=70 by using a one-dimensional LUT of the color component Y, and K2=22 to K1=23 by using a one-dimensional LUT of the color component K. By the update of the calibration profile using current one-dimensional LUTs (correction curves), a calibration profile that adjust (Cin, Min, Yin, Kin)=(20, 30, 70, 20) to adjustment values (Cm1, Mm1, Ym1, Km1)=(24, 30, 70, 23) is generated.

Alternatively, the one-dimensional LUT calculation portion 25 may create a correction curve as a one-dimensional LUT in the following way.

Specifically, the one-dimensional LUT calculation portion 25 may create one-dimensional LUTs by using the calibration profile generated in the last calibration, actual data pairs of the current measured color data (L1*, a1*, b1*) of each of the patches formed in the judgment block 101 and the one-dimensional LUT block 102 in the L*a*b* color space and the corresponding one of actual data (C, M, Y, K) of the patches, and the standard data.

Specifically, the one-dimensional LUT calculation portion 25 extracts grids of each of the color components (primary colors) in the calibration profile set in the color adjustment portion 29 in the last calibration. Then, the one-dimensional LUT calculation portion 25 creates adjustment curves (first adjustment curves) of the respective colors, the adjustment curves respectively associating the primary-color grid coordinate point (C, 0, 0, 0) and the corresponding adjustment values (Cm1, 0, 0, 0), the primary-color grid coordinate point (0, M, 0, 0) and the corresponding adjustment values (0, Mm1, 0 0), the primary-color grid coordinate point (0, 0, Y, 0) and the corresponding adjustment values (0, 0, Ym1, 0), and the primary-color grid coordinate point (0, 0, 0, K) and the corresponding adjustment values (0, 0, 0, Km1).

Moreover, by using actual data pairs each constituted of current measured color data (L1*, a1*, b1*) of each of the patches formed in the judgment block 101 and the one-dimensional LUT block 102 and corresponding one of the actual data (Cm2, 0, 0, 0), (0, Mm2, 0, 0), (0, 0, Ym2, 0) and (0, 0, 0, Km2) of the patches, (L*, a*, b*) of each color component (primary color) in the standard data, and the color data (C, 0, 0, 0), (0, M, 0, 0), (0, 0, Y, 0) and (0, 0, 0, K) of each of the patches, the one-dimensional LUT calculation portion 25 creates adjustment curves (second adjustment curves) of the respective color components, the adjustment curves associating the color data (C, 0, 0, 0) in the standard data and the actual data (Cm2, 0, 0, 0) of the corresponding patch, the color data (0, M, 0, 0) in the standard data and the actual data (0, Mm2, 0, 0) of the corresponding patch, the color data (0, 0, Y, 0) in the standard data and the actual data (0, 0, Ym2, 0) of the corresponding patch, and the color data (0, 0, 0, K) in the standard data and the actual data (0, 0, 0, Km2) of the corresponding patch.

The second adjustment curves are calculated in the same way as that described above. Specifically, the one-dimensional LUT calculation portion 25 obtains color differences between the measured color data (L1*, a1*, b1*) and a blank sheet and between the standard data (L*, a*, b*) and a blank sheet. In consideration of the color differences, which are one-dimensional values, the one-dimensional LUT calculation portion 25 associates C, M, Y and K in the standard data with the actual data C1, M1, Y1 and K1 of each of the patches, respectively. Then, for C, M, Y and K in the standard data and the actual data C1, M1, Y1 and K1 of the corresponding patches thus associated, the one-dimensional LUT calculation portion 25 calculates second adjustment curves by using interpolation operation, fitting processing or the like.

Figure 7:
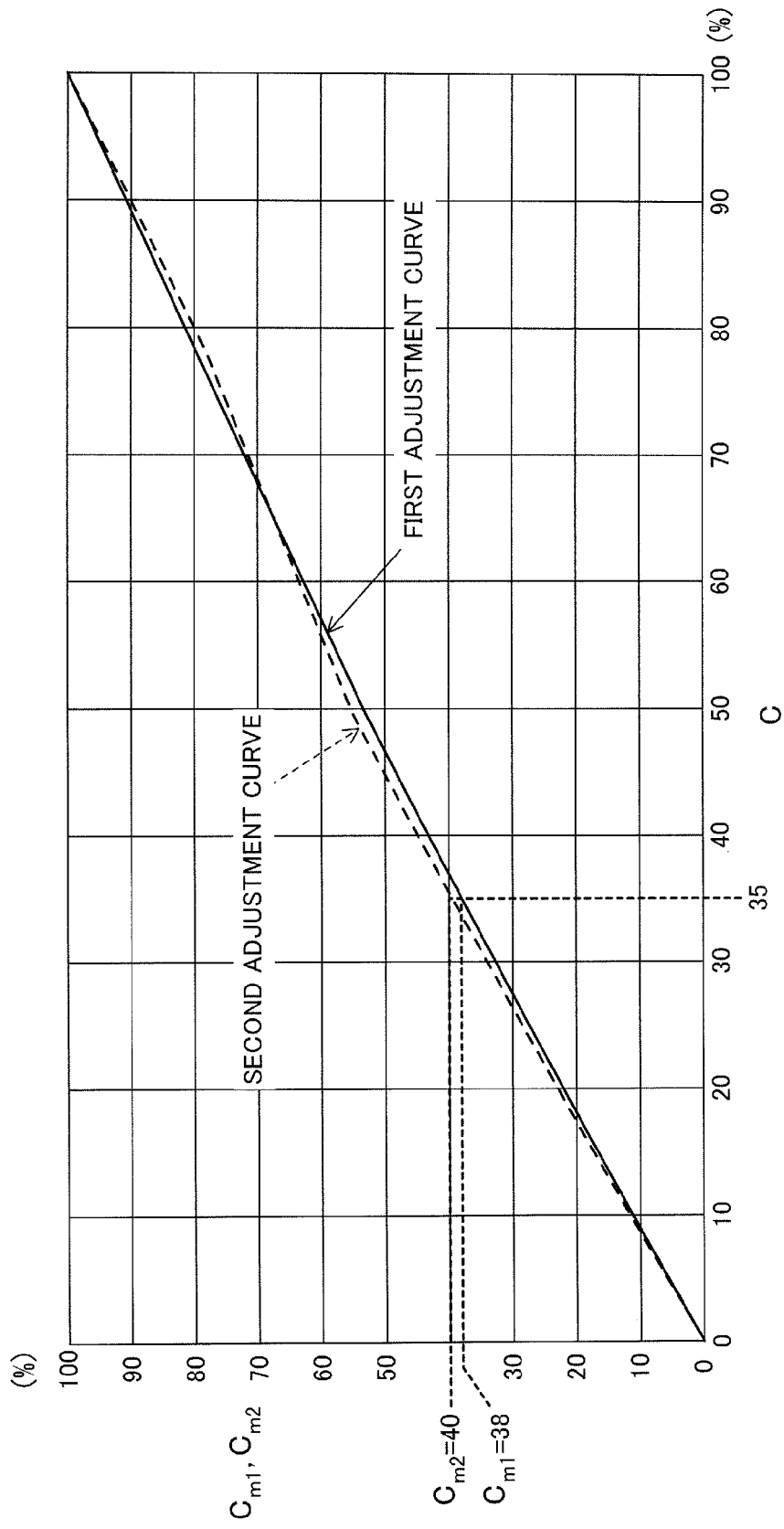
FIG. 7 is a graph illustrating a first adjustment curve of the color component C created on the basis of the calibration profile set in the color adjustment portion and a second adjustment curve of the color component C created on the basis of the current measured color data.

FIG. 7 is an example of a graph illustrating a first adjustment curve of the color component C created on the basis of the calibration profile set in the color adjustment portion 29 and a second adjustment curve of the color component C created on the basis of the current measured color data. With the first adjustment curve and the second adjustment curve illustrated in FIG. 7, a correction curve is obtainable by associating adjustment values (Cm1, 0, 0, 0) on the first adjustment curve and adjustment values (Cm2, 0, 0, 0) on the second adjustment curve for the single actual data (C, 0, 0, 0), for example. In the example shown in FIG. 7, for the actual data C=35, the adjustment value Cm1=38 on the first adjustment curve in the last calibration profile is associated with the adjustment value Cm2=40 on the second adjustment curve in the current measured color data. In this way, by associating the adjustment value Cm1 on the first adjustment curve and the adjustment value Cm2 on the second adjustment curve for the actual data (0, 0, 0, 0) to (100, 0, 0, 0) by the step, the one-dimensional LUT calculation portion 25 creates a correction curve, as a one-dimensional LUT, for the color component C. The same process is performed for each of the color components M, Y and K.

Description of Case of Recreating Entire Calibration Profile and Obtain New Calibration Profile Subsequently, when determining, on the basis of the above-described judgment criteria, to recreate the entire calibration profile and obtain a new calibration profile, the judgment portion 24 notifies the system controller 30 and the multidimensional LUT calculation portion 27 of the determination. Upon receipt of the notification that the entire calibration profile is to be recreated, the system controller 30 displays, on the display 70, an instruction to further perform color measurement on the one-dimensional LUT block 102 and the four-dimensional LUT block 103 of the color chart 100 by the colorimeter 5. In accordance with the instruction, the user measures the colors of patches formed in the one-dimensional LUT block 102 and the four dimensional LUT block 103 by using the colorimeter 5. Thereby, the calibration profile set in the color adjustment portion 29 is updated with a new calibration profile obtained by the recreation.

As described above, in the first exemplary embodiment, color measurement of the four-dimensional LUT block 103 is performed only when the judgment portion 24 determines, on the basis of the judgment criteria set in advance, to recreate the entire calibration profile and obtain a new calibration profile. Hence, color measurement for recreating the entire calibration profile is performed only when needed.

Here, if the calibration is the first one to be performed in the image forming system 1, the entire calibration profile is to be newly created, and hence the system controller 30 displays an instruction to measure the colors of the patches formed in the entire color chart 100 (the judgment block 101, the one-dimensional LUT block 102 and the four-dimensional LUT block 103).

When the colors of the patches formed in the one-dimensional LUT block 102 and the four-dimensional LUT block 103 are measured by the colorimeter 5, the multidimensional LUT calculation portion 27 acquires, from the measured color data storage 23, measured color data (L*, a*, b*), in the L*a*b* color space, of each of the patches formed in the entire color chart 100 (the judgment block 101, the one-dimensional LUT block 102 and the four-dimensional LUT block 103) measured in color by the colorimeter 5. Furthermore, the multidimensional LUT calculation portion 27 generates actual data pairs each including the actual data (C, M, Y, K) of each of the patches formed in the entire color chart 100 and the corresponding measured color data (L*, a*, b*) measured by the colorimeter 5. Then, by using the actual data pairs each including the actual data (C, M, Y, K) and the measured color data (L*, a*, b*), the multidimensional LUT calculation portion 27 calculates inverse color conversion characteristics from the input color space (L*a*b* color space) to the output color space (CMYK color space), the inverse color conversion characteristics representing the current color reproducibility in the image formation function portion 40.

Furthermore, the multidimensional LUT calculation portion 27 acquires the standard data from the standard data storage 22. Then, the multidimensional LUT calculation portion 27 calculates color conversion characteristics from the output color space (CMYK color space) to the input color space (L*a*b* color space) ("forward color conversion characteristics," below) to be used to estimate color coordinate values (L*, a*, b*) that are to be inputted to obtain color coordinate values (C, M, Y, K) printed by the image formation function portion 40.

Here, in the calculations of the inverse color conversion characteristics and the forward color conversion characteristics, employed is, for example, a method of performing statistical processing such as regression analysis by adding a weight to (weighting) the standard data (color coordinate data pair), a method of performing interpolation processing by simply calculating a weighted average for the standard data, a method of performing statistical processing by using a neural network that has learnt the standard data, or the like.

Then, the multidimensional LUT calculation portion 27 creates lattice points (C, M, Y, K) that divide the color components (the color component C, the color component M, the color component Y and the color component K) of the CMYK color space, by the predetermined step (for example, by the step of 10%), and converts each of the lattice points to color coordinate values (L*, a*, b*) of the L*a*b* color space by using the forward color conversion characteristics. Furthermore, the multidimensional LUT calculation portion 27 converts the color coordinate values (L*, a*, b*) of the L*a*b* color space to color coordinate values (C', M', Y', K') of the CMYK color space by using the inverse color conversion characteristics.

In this case, in conversion from the color coordinate values (L*, a*, b*) of the three-dimensional L*a*b* color space to the color coordinate values (C', M', Y', K') of the four-dimensional CMYK color space, a unique solution is not determined due to a lack of known numbers. For this reason, calculation is performed under the restriction conditions that "a primary color is converted to a primary color" and "a secondary color is converted to a secondary color" in such a case, for example.

In this way, the multidimensional LUT calculation portion 27 creates combinations (a calibration profile) each formed of each of the lattice points (C, M, Y, K) and the corresponding color coordinate values (C', M', Y', K') calculated by using the forward color conversion characteristics and the inverse color conversion characteristics. When the lattice points (C, M, Y, K) that divide color components by the step of 10%, for example, are used, the calibration profile is constituted of $11^4$ data pairs in total.

Then, the multidimensional LUT calculation portion 27 outputs the created calibration profile (four-dimensional LUT) to the second update portion 28.

The second update portion 28 replace (rewrite) the calibration profile set in the color adjustment portion 29, with the calibration profile newly created by the multidimensional LUT calculation portion 27.

Description of Judgment Processing Performed by Judgment Portion

Figure 8:
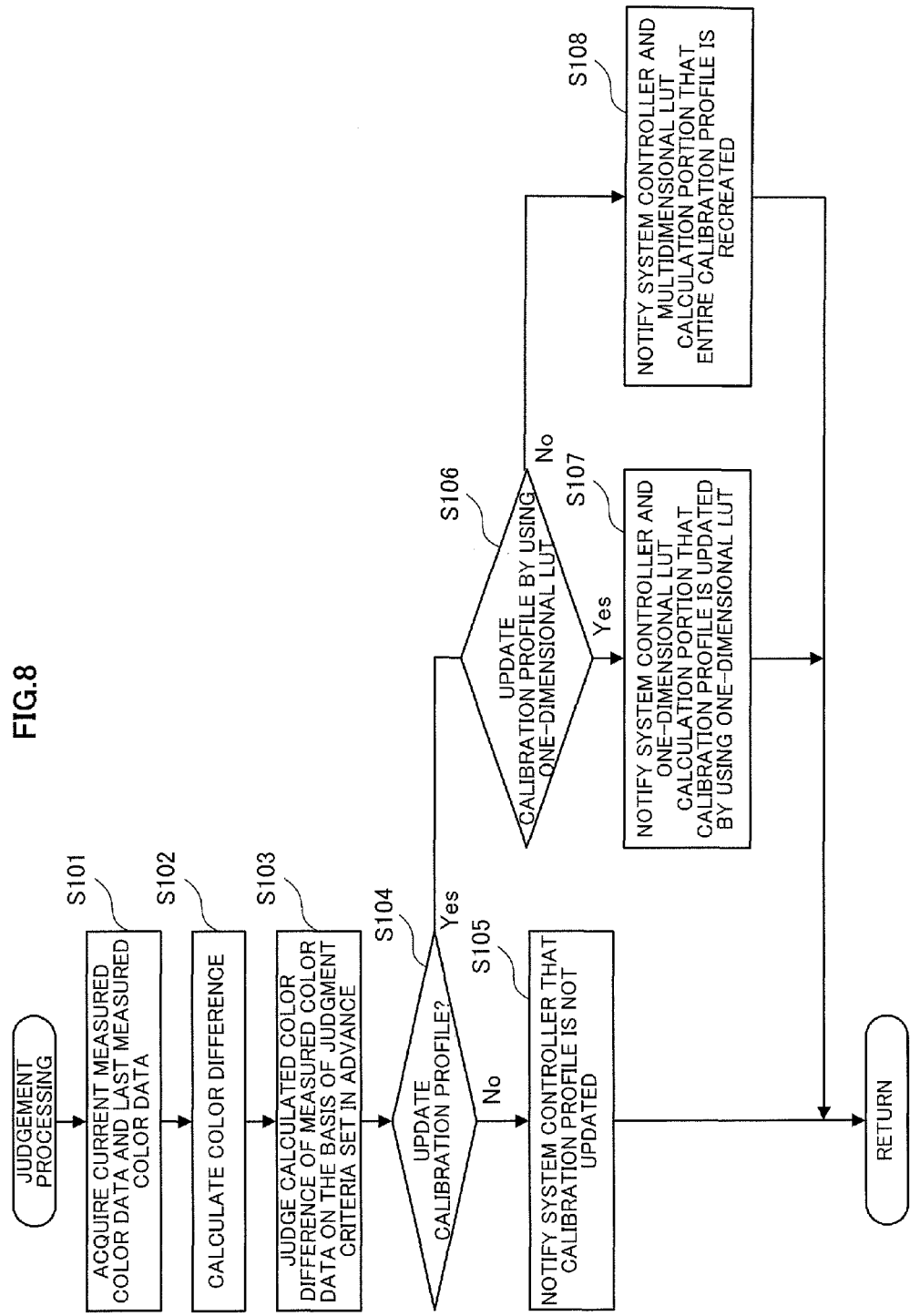
FIG. 8 is a flowchart showing an example of the contents of the judgment processing for an update of a calibration profile performed by the judgment portion.

In the following, a description will be given of judgment processing for an update of a calibration profile performed by the judgment portion 24. FIG. 8 is a flowchart showing an example of the contents of the judgment processing for an update of a calibration profile performed by the judgment portion 24.

As shown in FIG. 8, when the measured color data measured by the colorimeter 5 is stored in the measured color data storage 23, the judgment portion 24 acquires, from the measured color data storage 23, the measured color data obtained in the current color measurement and the measured color data obtained in the last color measurement (Step 101). Then, the judgment portion 24 calculates a color difference between the measured color data obtained in the current color measurement and the measured color data obtained in the last color measurement (Step 102).

Then, for example, on the basis of a judgment criteria set in advance for a calculated color difference of measured color data, the judgment portion 24 judges whether or not to update the calibration profile, and also whether to update the calibration profile by using a one-dimensional LUT or to recreate the entire calibration profile and obtain a new calibration profile (Step 103).

When determining not to update the calibration profile (No in Step 104), the judgment portion 24 notifies the system controller 30 of the determination (Step 105) and terminates the judgment processing.

Upon receipt of the notification, the system controller 30 displays, on the display 70, that the calibration profile does not need to be updated and hence no color measurement of the color chart 100 by the colorimeter 5 is needed.

When determining to update the calibration profile by using a one-dimensional LUT (Yes in Step 104, and Yes in Step 106), the judgment portion 24 notifies the system controller 30 and the one-dimensional LUT calculation portion 25 of the determination (Step 107), and terminates the judgment processing.

Upon receipt of the notification, the system controller 30 displays, on the display 70, an instruction to perform color measurement on the one-dimensional LUT block 102 of the color chart 100 by the colorimeter 5. Moreover, the one-dimensional LUT calculation portion 25 calculates a one-dimensional LUT to be used for the update of the calibration profile.

Meanwhile, when determining to recreate the entire calibration profile and obtain a new calibration profile (Yes in Step 104, and No in Step 106), the judgment portion 24 notifies the system controller 30 and the multidimensional LUT calculation portion 27 of the determination (Step 108), and terminates the judgment processing.

Upon receipt of the notification, the system controller 30 displays, on the display 70, an instruction to further perform color measurement on the one-dimensional LUT block 102 and the four-dimensional LUT block 103 of the color chart 100 by the colorimeter 5. Moreover, the multidimensional LUT calculation portion 27 newly creates the entire calibration profile.

Here, the judgment portion 24 of the first exemplary embodiment is configured to judge whether or not to perform an update of the calibration profile, and also judge, when determining to update the calibration profile, whether to perform an update of the calibration profile by using a one-dimensional LUT or to recreate the entire calibration profile and obtain a new calibration profile. Alternatively, the judgment portion 24 may be configured to perform update judgment having a larger number of steps, when determining to update the calibration profile. For example, the judgment portion 24 may determine whether: to update the calibration profile by using a one-dimensional LUT; to update the calibration profile by recreating parts of the calibration profile such as three-dimensional LUT parts of the color component Y, the color component M and the color component C, for example, or a tertiary color parts generated by mixing three color components (the color component C, the color component M and the color component Y); or to recreate the entire calibration profile and obtain a new calibration profile.

Second Exemplary Embodiment

Description of Color Adjustment Processor

Next, a color adjustment processor 20 according to another exemplary embodiment included in the above-described image processor 10 will be described. Here, a description will be given of a configuration of using 6 colors including light cyan (LC), dark cyan (DC), light magenta (LM), dark magenta (DM), Y and K as color materials used in an image forming system 1 (image formation function portion 40). The color LC is cyan having a light color tone (one of or both of brightness and chroma are relatively high), while the color DC is cyan having a darker color tone (one of or both of brightness and saturation are relatively low) than the color LC. The color LM is magenta having a light color tone, while the color DM is magenta having a darker color tone than the color LM.

A color component LC and a color component DC in image data are generated in such a way that the color adjustment processor 20 separates a color component C by using a color-separation table set in advance. Similarly, a color component LM and a color component DM are generated in such a way that the color adjustment processor 20 separates a color component M by using a color-separation table set in advance.

Figure 9:
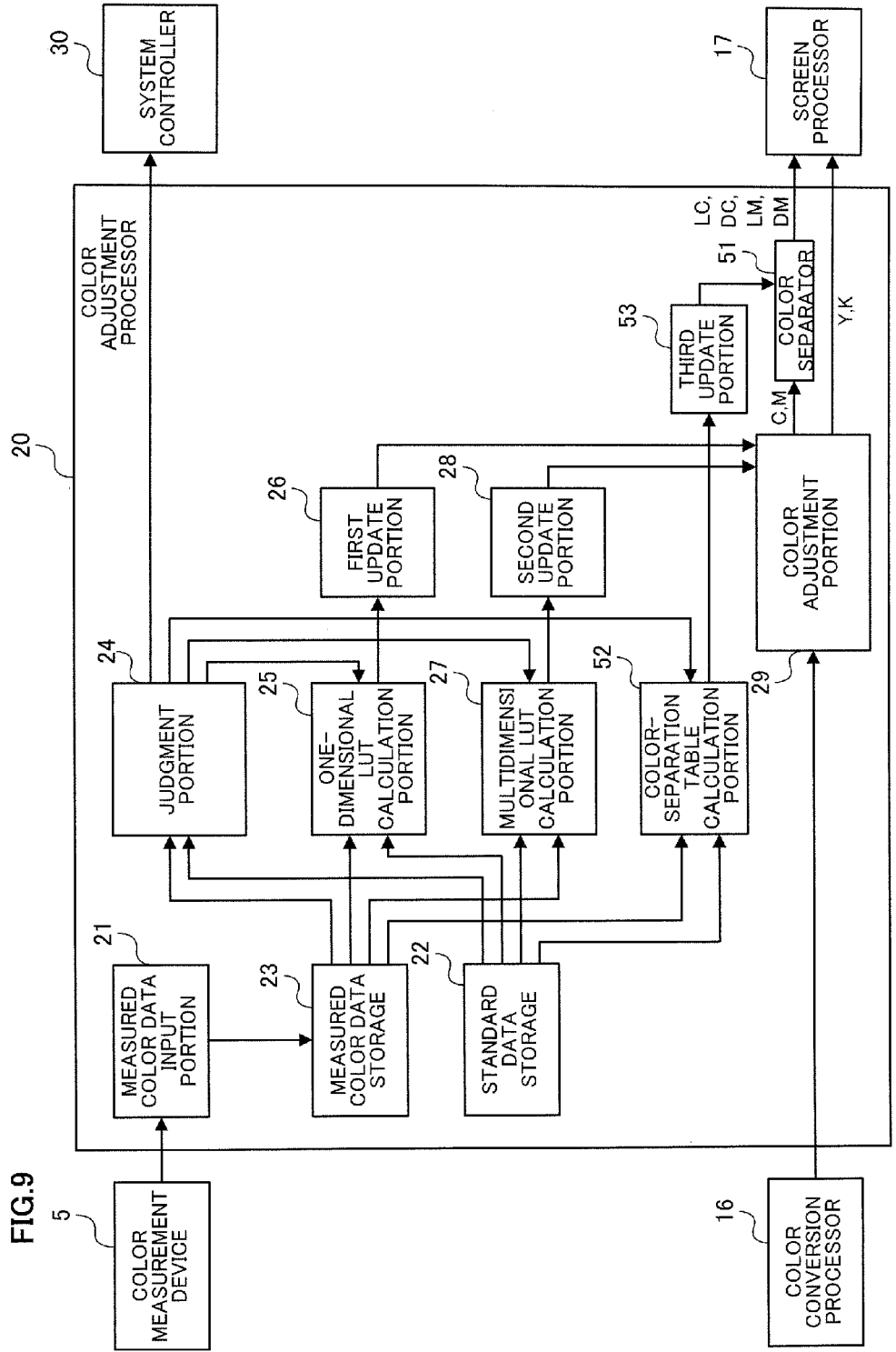
FIG. 9 is a block diagram showing a configuration of the color adjustment processor of the second exemplary embodiment.

FIG. 9 is a block diagram showing a configuration of the color adjustment processor 20 of the second exemplary embodiment.

As shown in FIG. 9, the color adjustment processor 20 of the second exemplary embodiment includes, in addition to the configuration of the first exemplary embodiment shown in FIG. 3, a color separator 51, a color-separation table calculation portion 52 and a third update portion 53. The color separator 51 is an example of a color separation unit that separates the color component C into a color component LC and a color component DC as well as the color component M into a color component LM and a color component DM. The color-separation table calculation portion 52 calculates a color-separation table to be used to update a color-separation table as an example of a separation factor group to be used in color separation. The third update portion 53 updates a color-separation table set in the color separator 51 with the color-separation table calculated by the color-separation table calculation portion 52.

A color-separation table here is a table that provides a first color component value and a second color component value for a separation of a color component (color component C or color component M) to a first color component (color component LC or color component LM) and a second color component (color component DC or color component DM).

Figure 10:
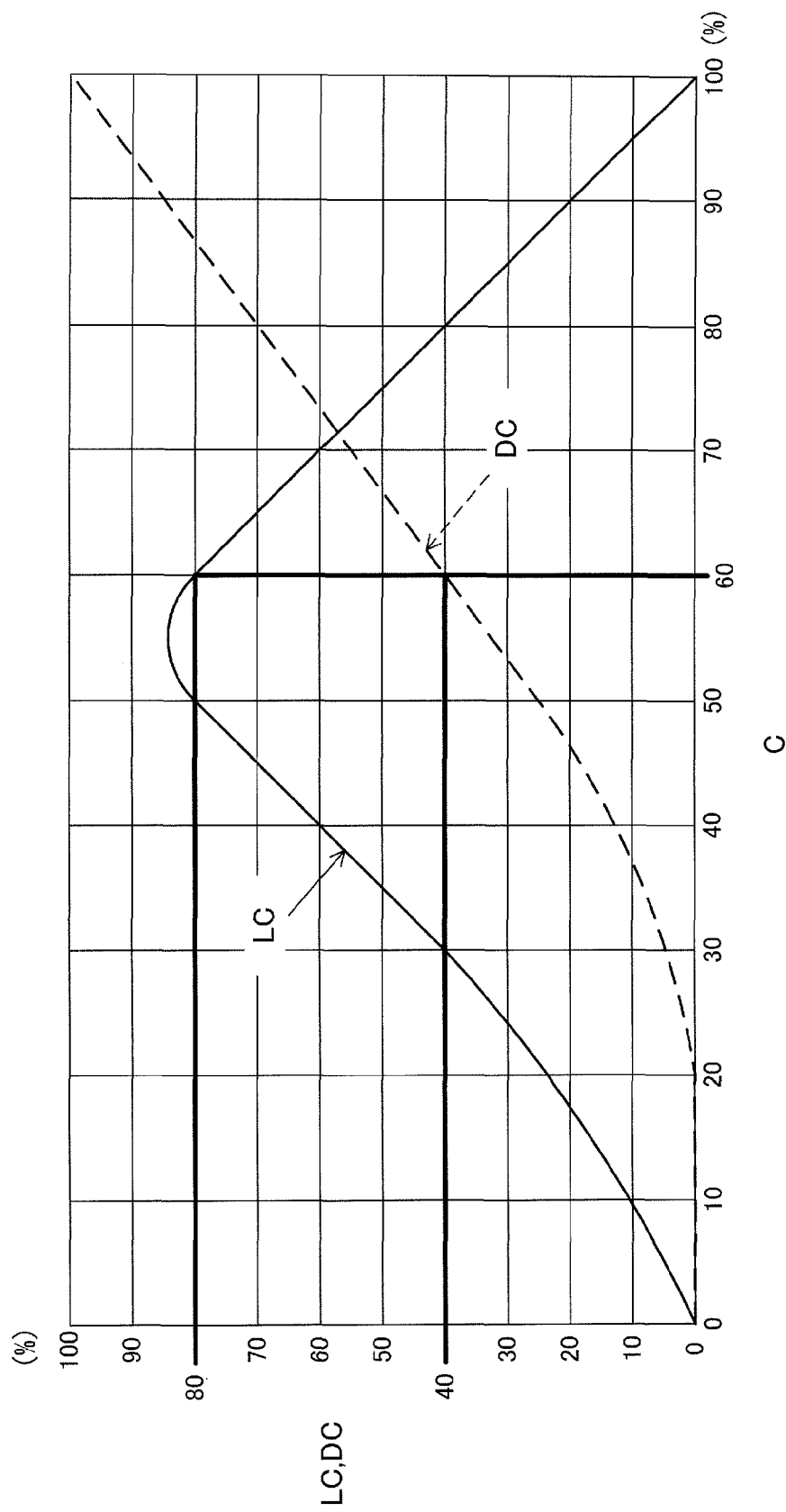
FIG. 10 is a graph showing an example of a color-separation table for the color component C set in the color separator.

FIG. 10 is a graph showing an example of a color-separation table for the color component C set in the color separator 51. In the color-separation table shown in FIG. 10, the color component C is separated into a color component LC and a color component DC respectively at rates corresponding to a color coordinate value (horizontal axis) of the color component C. For example, when the color coordinate value of the color component C is 60%, the separation is performed so that the value of the color component LC would be 80% and the value of the color component DC would be 40%.

As in the above-described case of the calibration profile set in the color adjustment portion 29, the color-separation table calculation portion 52 calculates a color-separation table in accordance with a judgment result obtained by a judgment portion 24.

In this case, the judgment portion 24 judges (determines) whether or not an update of the color-separation tables is needed, by using measured color data on a judgment block of a color chart to be described later. For example, on the basis of judgment criteria set in advance, the judgment portion 24 makes any of the following determinations that: (1) neither the calibration profile nor the color-separation tables are to be updated; (2) only an update of the calibration profile using a one-dimensional LUT is to be performed; (3) an update of the calibration profile using a one-dimensional LUT and an update of the color-separation tables are to be performed; (4) the entire calibration profile is to be recreated to obtain a new calibration profile; and (5) the entire calibration profile is to be recreated to obtain a new calibration profile and an update of the color-separation tables is to be performed. In the cases (3) and (5) in which the judgment portion 24 determines that an update of the color-separation tables is needed, the color-separation table calculation portion 52 calculates a color-separation table for each of the color component C and the color component M.

The third update portion 53 corrects color-separation tables for the color component C and the color component M set in the color separator 51, by using the color-separation tables for the color component C and the color component M calculated by the color-separation table calculation portion 52.

Description of Procedure for Updates of Calibration Profile and Color-Separation Tables When a UI unit 60, for example, receives, from a user, an operation input that instructs updates of a calibration profile and color-separation tables, the system controller 30 (see FIG. 1) firstly instructs the image formation function portion 40 to print a first color chart including: a judgment block including color samples (patches) to be used by the judgment portion 24 to perform judgment on updates of a calibration profile and color-separation tables; and a color-separation table block including patches to be used to calculate color-separation tables used for an update of color-separation tables.

Furthermore, the system controller 30 instructs, by using a display 70, the user to measure the colors of the patches formed in the judgment block of the first color chart by using a colorimeter 5. When the user obtains the colors of the patches formed in the judgment block measured by the colorimeter 5, a measured color data inputting portion 21 of the color adjustment processor 20 acquires measured color data obtained by the colorimeter 5. The measured color data inputting portion 21 transfers the acquired measured color data to a measured color data storage 23, and the measured color data storage 23 stores therein the current measured color data in addition to last measured color data.

In the judgment block of this case, 40 patches are printed in addition to the 66 patches printed in the judgment block 101 of the color chart 100 shown in FIG. 4. The 40 patches are those of the color component LC, the color component DC, the color component LM and the color component DM each printed by the step of 10%.

Furthermore, in the color-separation table block, a total of 242 patches are printed. The 242 patches are: 121 patches obtained by printing mixed colors of the color component LC and the color component DC whose values are changed by the step of 10%; and 121 patches obtained by printing mixed colors of the color component LM and the color component DM whose values are changed by the step of 10%.

On the basis of the same judgment criteria as the case of a calibration profile set in the color adjustment portion 29, the judgment portion 24 makes any of the above-described determinations (1) to (5). For example, the judgment portion 24 acquires, from the measured color data storage 23, current measured color data and last measured color data on each of the patches formed in the judgment block. Then, the judgment portion 24 calculates a difference (color difference) between the current measured color data and the last measured color data, and makes any of the above-described determinations (1) to (5) on the basis of the judgment criteria set in advance on the color difference (see the judgment criteria in the first exemplary embodiment). In this event, the judgment portion 24 may employ the other judgment methods described in the first exemplary embodiment, instead of the method of using a color difference between the current measured color data and the last measured color data on each of the patches formed in the judgment block.

Description of Case of Performing Update of Calibration Profile by Using One-Dimensional LUT When the judgment portion 24 makes the determination (2) that "only an update of the calibration profile using a one-dimensional LUT is to be performed" on the basis of the judgment result, the system controller 30 instructs the image formation function portion 40 to print a second color chart including: a one-dimensional LUT block including patches to be used for calculation of a one-dimensional LUT to be used to update the calibration profile; and a multidimensional LUT block (four-dimensional LUT block) including patches to be used for an update of the entire calibration profile. Hence, the second color chart is printed after the first color chart is printed, and the two color charts are printed on different sheets of the same kind.

In this case, the color-separation tables for the color component C and the color component M currently set in the color separator 51 are applied to the one-dimensional LUT block and the multidimensional LUT block and the same patches as those printed in the one-dimensional LUT block 102 and the four-dimensional LUT block 103 of the color chart 100 shown in FIG. 4 are printed in the one-dimensional LUT block and the multidimensional LUT block.

Moreover, the system controller 30 instructs, by using the display 70, the user to measure the colors of patches formed in the one-dimensional LUT block of the second color chart, while notifying the user that color measurement of the color-separation table block of the first color chart is not needed. Thereby, the user measures the colors of the patches formed in the one-dimensional LUT block by using the colorimeter 5, and then the measured color data inputting portion 21 of the color adjustment processor 20 acquires the measured color data obtained by the colorimeter 5. The measured color data inputting portion 21 transfers the acquired measured color data to the measured color data storage 23, and the measured color data storage 23 stores therein the current measured color data in addition to the last measured color data.

The one-dimensional LUT calculation portion 25 acquires, from the measured color data storage 23, the measured color data on each of the patches formed in the judgment block of the first color chart and the one-dimensional LUT block of the second color chart, the measured color data obtained in the current color measurement by the colorimeter 5. Moreover, the one-dimensional LUT calculation portion 25 acquires, from the measured color data storage 23, the measured color data on each of the patches formed in the judgment block of the first color chart and the one-dimensional LUT block of the second color chart, the measured color data obtained at the time of the last calibration. Then, the one-dimensional LUT calculation portion 25 calculates a one-dimensional LUT (correction curve) of each color component, and outputs the calculated one-dimensional LUTs of the respective color components to the first update portion 26, by the same method as that described in the first exemplary embodiment.

By using the one-dimensional LUTs of the respective color components acquired from the one-dimensional LUT calculation portion 25, the first update portion 26 corrects all the grids (primary color components, secondary color components, tertiary color components and quartic color components) constituting the calibration profile set in the color adjustment portion 29.

Description of Case of Recreating Entire Calibration Profile and Obtain New Calibration Profile When the judgment portion 24 makes the above determination (4) that "the entire calibration profile is to be recreated to obtain a new calibration profile" on the basis of the judgment result, the system controller 30 instructs the image formation function portion 40 to print the second color chart constituted of the one-dimensional LUT block and the multidimensional LUT block.

In this case, the color-separation tables for the color component C and the color component M currently set in the color-separator 51 are applied to the one-dimensional LUT block and the multidimensional LUT block, and the same patches as those printed in the one-dimensional LUT block 102 and the four-dimensional LUT block 103 of the color chart 100 shown in FIG. 4 are printed in the one-dimensional LUT block and the multidimensional LUT block.

Moreover, the system controller 30 instructs, by using the display 70, the user to measure the colors of patches formed in the one-dimensional LUT block and the multidimensional LUT block of the second color chart, while notifying the user that color measurement of the color-separation table block of the first color chart is not needed. Thereby, the user measures the colors of the patches formed in the one-dimensional LUT block and the multidimensional LUT block by using the colorimeter 5, and then the measured color data inputting portion 21 of the color adjustment processor 20 acquires the measured color data obtained by the colorimeter 5.

The multidimensional LUT calculation portion 27 acquires, from the measured color data storage 23, measured color data on each of the patches formed in the judgment block of the first color chart, and the one-dimensional LUT block and the four-dimensional LUT block of the second color chart, obtained by the colorimeter 5. Moreover, the multidimensional LUT calculation portion 27 acquires the standard data from the standard data storage 22. Then, the multidimensional LUT calculation portion 27 creates a calibration profile by the same method as that described in the first exemplary embodiment. The multidimensional LUT calculation portion 27 outputs the created calibration profile (four-dimensional LUT) to the second update portion 28. Thereby, the second update portion 28 replaces (rewrites) the calibration profile set in the color adjustment portion 29 with the calibration profile newly created by the multidimensional LUT calculation portion 27.

Description of Case of Performing Update of Color-Separation Tables

When the judgment portion 24 makes the above determination (3) that "an update of the calibration profile using a one-dimensional LUT and an update of the color-separation tables are to be performed" or the determination (5) that "the entire calibration profile is to be recreated to obtain a new calibration profile and an update of the color-separation tables is to be performed" on the basis of the judgment result, the system controller 30 instructs, by using the display 70, the user to perform color measurement on the color-separation table block of the first color chart. When the user measures the colors of the patches formed in the color-separation table block by using the colorimeter 5, the measured color data inputting portion 21 of the color adjustment processor 20 acquires the measured color data obtained by the colorimeter 5. The measured color data inputting portion 21 transfers the acquired measured color data to the measured color data storage 23, and the measured color data storage 23 stores therein the current measured color data in addition to the last measured color data.

Then, by using the measured color data stored in the measured color data storage 23 and the standard data from the standard data storage 22, the color-separation table calculation portion 52 calculates color-separation tables for the respective color component C and the color component M by the method to be described later. By using the color-separation tables for the color component C and the color component M calculated by the color-separation table calculation portion 52, the third update portion 53 corrects the color-separation tables for the color component C and the color component M set in the color separator 51.

Subsequently, the system controller 30 instructs the image formation function portion 40 to print both the first color chart constituted of the judgment block and the color-separation table block, and the second color chart constituted of the one-dimensional LUT block and the multidimensional LUT block.

In this case, the color-separation tables for the color component C and the color component M corrected by the third update portion 53 are applied in the color separator 51, and the first color chart and the second color chart are printed.

Thereafter, by the above-described method, the one-dimensional LUT calculation portion 25 calculates one-dimensional LUTs (correction curves) of the respective color components by using the measured color data on the judgment block of the first color chart and the one-dimensional LUT block of the second color chart. Moreover, the multidimensional LUT calculation portion 27 calculates a calibration profile by using the measured color data on the judgment block of the first color chart and the one-dimensional LUT block and the four-dimensional LUT block of the second color chart, as well as the standard data.

In this event, the second color chart, printed by applying thereto the color-separation tables for the color component C and the color component M corrected by the third update portion 53, may be configured so as to include all the patches needed to calculate a one-dimensional LUT and a calibration profile. In such a case, the first color chart does not need to be printed.

Description of Method of Calculating Color-Separation Tables

The calculation of color-separation tables by the color-separation table calculation portion 52 is performed in the following way.

When color measurement of the patches formed in the color-separation table block of the first color chart is performed by the colorimeter 5, the color-separation table calculation portion 52 acquires, from the measured color data storage 23, measured color data (L*, a*, b*), in the L*a*b* color space, on each of the patches of the color component LC, the color component DC, the color component LM and the color component DM formed in the judgment block and the color-separation table block. Moreover, the color-separation table calculation portion 52 generates actual data pairs each including actual data (LC, DC) or (LM, DM) on each of the patches formed in the judgment block and the color-separation table block and the measured color data (L*, a*, b*) measured by the colorimeter 5. By using the actual data pairs each including the actual data (LC, DC) or (LM, DM) and the measured color data (L*, a*, b*), the color-separation table calculation portion 52 calculates inverse color conversion characteristics from the input color space (L*a*b* color space) to each of output color spaces (a LC, DC color space and a LM, DM color space) in the current color separator 51.

In this case, the conversion from the color coordinate values (L*, a*, b*) of the three-dimensional L*a*b* color space to each of the color coordinate values (LC, DC) and (LM, DM) of the two-dimensional CMYK color space includes some degrees of freedom and thus has multiple solutions. For this reason, in this case, calculation is performed under a restriction condition such as "to set an upper limit for a LC component value corresponding to the inputted color coordinate values of the color component C," "to set a lower limit for a DC component value corresponding to the inputted color coordinate values of the color component C," "to set an upper limit for a total value of a LC component value and a DC component value corresponding to the inputted color coordinate values of the color component C," "to maintain continuity between the color coordinate values (LC, DC) and the color coordinate values (LM, DM)" or the like, for example.

Furthermore, the color-separation table calculation portion 52 acquires, from the standard data storage 22, standard data defining the relationships between (C, 0, 0, 0) and (LC, DC), and between (0, M, 0, 0) and (LM, DM). Thereby, the color-separation table calculation portion 52 calculates forward color conversion characteristics from the output color space (CMYK color space) to the input color space (L*a*b* color space), the characteristics used to estimate color coordinate values (L*, a*, b*) to be inputted to obtain each of the color coordinate values (C, 0, 0, 0) and (0, M, 0, 0) printed by the color separator 51.

Here, in the calculations of the inverse color conversion characteristics and the forward color conversion characteristics, employed is, for example, a method of performing statistical processing such as regression analysis by adding a weight to (weighting) the standard data (each color coordinate data pair), a method of performing interpolation processing by simply calculating a weighted average for the standard data, a method of performing statistical processing by using a neural network that has learnt the standard data, or the like.

The color-separation table calculation portion 52 creates lattice points (C, 0, 0, 0) and (0, M, 0, 0) each of which divides the corresponding one of the color components (the color component C and the color component M) of the CMYK color space, by the step set in advance (for example, by the step of 10%), and converts each of the lattice points to color coordinate values (L*, a*, b*) of the L*a*b* color space by using the forward color conversion characteristics. Furthermore, the color-separation table calculation portion 52 converts the color coordinate values (L*, a*, b*) of the L*a*b* color space to color coordinate values (LC, DC) and (LM, DM) of the CMYK color space by using the inverse color conversion characteristics.

In this way, the color-separation table calculation portion 52 creates combinations (color-separation tables) of the lattice point (C, 0, 0, 0) and the color coordinate values (LC, DC) as well as the lattice point (0, M, 0, 0) and the color coordinate values (LM, DM), the color coordinate values (LC, DC) and (LM, DM) calculated by using the forward color conversion characteristics and the inverse color conversion characteristics.

Then, the color-separation table calculation portion 52 outputs the created color-separation tables to the third update portion 53.

The third update portion 53 replaces (rewrites) the color-separation tables set in the color separator 51 with the color-separation tables newly created by the color-separation table calculation portion 52.

Although a description has been given of the configuration of arranging the color separator 51 on the output side of the color adjustment portion 29 in the second exemplary embodiment, such a configuration that the color adjustment portion 29 includes therein the color separator 51 may be employed. Alternatively, the color separator 51 may be arranged on the input side of the color adjustment portion 29. In these cases, the calibration profile including the color component Y, the color component K, the color component LC, the color component DC, the color component LM and the color component DM, for example, is set in the color adjustment portion 29. Thereby, color adjustment is directly performed on the color component LC, the color component DC, the color component LM and the color component DM, as well.

Moreover, although both the color-separation table (C, 0, 0, 0)->(LC, DC) and the color-separation table (0, M, 0, 0)-> (LM, DM) are configured to be updated in the second exemplary embodiment, such a configuration that only one of the color-separation tables is updated may be employed.

As described above, in the color adjustment processor 20 of the second exemplary embodiment, judgment on an update of a calibration profile or color-separation tables is performed by using the judgment block 101 including the smaller number of patches than the number of any of the one-dimensional LUT block 102 for calculating a one-dimensional LUT to be used to update a calibration profile and the four-dimensional LUT block 103 to be used to update the entire calibration profile. With this configuration, the frequency of measuring the colors of a large number of patches for an update of a calibration profile or color-separation table is reduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a color conversion unit that color-converts an image signal of a first color space into an image signal of a second color space by using a color conversion characteristic defining a correspondence relationship between the image signal of the first color space and the image signal of the second color space;
an adjustment unit that adjusts the image signal of the second color space color-converted by the color conversion unit, in accordance with a change in the color conversion characteristic;
a correction unit that corrects a conversion factor group for adjustment, the conversion factor group used when the image signal of the second color space is adjusted by the adjustment unit;
a judgment unit that judges whether or not the conversion factor group for adjustment needs to be corrected by the correction unit, on the basis of a result of color measurement of a second color sample group including color samples the number of which is smaller than the number of color samples included in a first color sample group on which color measurement is performed to create the conversion factor group for adjustment to be set in the adjustment unit; and
a notifying unit that notifies a user that color measurement is not necessary to be performed except on the second color sample group, or notifies the user that color measurement is necessary to be performed on at least one of the first color sample group and one or a plurality of third color sample groups, on the basis of a result of the judgment by the judgment unit for the correction of the conversion factor group for adjustment, the one and the plurality of third sample groups each including color samples the number of which is smaller than the number of color samples included in the first color sample group and larger than the number of color samples included in the second color sample group.

2. The image processing apparatus according to claim 1, wherein, when judging that the conversion factor group for adjustment needs to be corrected, the judgment unit further judges whether to calculate conversion factor groups for respective color components constituting the conversion factor group for adjustment and correct the entire conversion factor group for adjustment by using the conversion factor groups for the respective color components that have been calculated, or to correct the conversion factor group for adjustment so that any one of the entire conversion factor group for adjustment and a part of the conversion factor group for adjustment is newly recreated, on the basis of the result of the color measurement of the second color sample group.

3. The image processing apparatus according to claim 1, wherein, in accordance with a result of the judgment by the judgment unit for the correction of the conversion factor group for adjustment, the correction unit calculates conversion factor groups for respective color components constituting the conversion factor group for adjustment and corrects the entire conversion factor group for adjustment by using the conversion factor groups for the respective color components that have been calculated, or the correction unit corrects the conversion factor group for adjustment to newly recreates any one of the entire conversion factor group for adjustment and a part of the conversion factor group for adjustment, and then the correction unit updates the conversion factor group for adjustment used by the correction unit, by use of the conversion factor group for adjustment that has been corrected.

4. The image processing apparatus according to claim 1, further comprising a color separation unit that separates one or a plurality of color components constituting the image signal of the second color space into a first color component and a second color component that is lower in any one or both of brightness and chroma than the first color component, the image signal of the second color space being color-converted by the color conversion unit or adjusted by the adjustment unit,
> wherein the judgment unit judges, on the basis of the result of the color measurement of the second color sample group, whether or not a separation factor group needs to be corrected, the separation factor group being used by the color separation unit and defining a value of the first color component and a value of the second color component when the one or plurality of color components is separated into the first color component and the second color component.

5. An image forming system comprising:
an image processing unit that performs image processing on an image signal of a first color space and generates an image signal of a second color space; and
an image forming unit that forms an image on a recording medium on the basis of the image signal of the second color space generated by the image processing unit;
the image processing unit including:
a color conversion unit that color-converts the image signal of the first color space into the image signal of the second color space by using a color conversion characteristic defining a correspondence relationship between the image signal of the first color space and the image signal of the second color space;
an adjustment unit that adjusts the image signal of the second color space color-converted by the color conversion unit, in accordance with a change in the color conversion characteristic;
a correction unit that corrects a conversion factor group for adjustment, the conversion factor group used when the image signal of the second color space is adjusted by the adjustment unit;
a judgment unit that judges whether or not the conversion factor group for adjustment needs to be corrected by the correction unit, on the basis of a result of color measurement of a second color sample group including color samples the number of which is smaller than the number of color samples included in a first color sample group on which color measurement is performed to create the conversion factor group for adjustment to be set in the adjustment unit; and
a notifying unit that notifies a user that color measurement is not necessary to be performed except on the second color sample group, or notifies the user that color measurement is necessary to be performed on at least one of the first color sample group and one or a plurality of third color sample groups, on the basis of a result of the judgment by the judgment unit for the correction of the conversion factor group for adjustment, the one and the plurality of third sample groups each including color samples the number of which is smaller than the number of color samples included in the first color sample group and larger than the number of color samples included in the second color sample group.

6. The image forming system according to claim 5, wherein when judging that the conversion factor group for adjustment needs to be corrected, the judgment unit of the image processing unit further judges whether to calculate conversion factor groups for respective color components constituting the conversion factor group for adjustment and correct the entire conversion factor group for adjustment by using the conversion factor groups for the respective color components that have been calculated, or to correct the conversion factor group for adjustment so that any one of the entire conversion factor group for adjustment and a part of the conversion factor group for adjustment is newly recreated, on the basis of the result of the color measurement of the second color sample group.

7. The image forming system according to claim 5, wherein, in accordance with a result of the judgment by the judgment unit for the correction of the conversion factor group for adjustment, the correction unit of the image processing unit calculates conversion factor groups for respective color components constituting the conversion factor group for adjustment and corrects the entire conversion factor group for adjustment by using the conversion factor groups for the respective color components that have been calculated, or the correction unit corrects the conversion factor group for adjustment to newly recreates any one of the entire conversion factor group for adjustment and a part of the conversion factor group for adjustment, and then the correction unit updates the conversion factor group for adjustment used by the correction unit, by use of the conversion factor group for adjustment that has been corrected.

8. The image forming system according to claim 5, further comprising a receiving unit that receives, from a user, an input of an instruction to correct the conversion factor group for adjustment to be used to adjust the image signal of the second color space by the adjustment unit of the image processing unit,
> wherein the image forming unit forms an image including the second color sample group on a recording medium upon receipt of the input of the instruction by the receiving unit.

9. The image forming system according to claim 8, wherein the image forming unit forms an image including the second color sample group in which each of primary colors of the second color space is formed by using color coordinate values at certain intervals.

10. An image processing method of an image processing apparatus including a correction unit that corrects a conversion factor group for adjustment used when an image signal of a second color space converted by using a color conversion characteristic is adjusted in accordance with a change in the color conversion characteristic, the color conversion characteristic defining a correspondence relationship between an image signal of a first color space and the image signal of the second color space, the image processing method comprising:
acquiring measured color data of a second color sample group including color samples the number of which is smaller than the number of color samples included in a first color sample group on which color measurement is performed to create the conversion factor group for adjustment;
acquiring a target data group from a memory storing the target data group that sets the color conversion characteristic to become a target, and that is constituted of combinations each formed of the image signal of the first color space and the image signal of the second color space;
comparing the measured color data and the target data group that have been acquired, and judging whether or not correction on the conversion factor group for adjustment is needed on the basis of a result of the comparison between the measured color data and the target data group; and
notifying a user that color measurement is not necessary to be performed except on the second color sample group, or notifying the user that color measurement is necessary to be performed on at least one of the first color sample group and one or a plurality of third color sample groups, on the basis of a result of the judging for the correction of the conversion factor group for adjustment, the one and the plurality of third sample groups each including color samples the number of which is smaller than the number of color samples included in the first color sample group and larger than the number of color samples included in the second color sample group.

11. A non-transitory computer readable medium storing a program causing a computer to execute a process for image processing, the process comprising:

correcting a conversion factor group for adjustment used when an image signal of a second color space converted by using a color conversion characteristic is adjusted in accordance with a change in the color conversion characteristic, the color conversion characteristic defining a correspondence relationship between an image signal of a first color space and the image signal of the second color space;

acquiring measured color data of a second color sample group including color samples the number of which is smaller than the number of color samples included in a first color sample group on which color measurement is performed to create the conversion factor group for adjustment;

acquiring a target data group from a memory storing the target data group that sets the color conversion characteristic to become a target, and that is constituted of combinations each formed of the image signal of the first color space and the image signal of the second color space; and comparing the measured color data and the target data group that have been acquired, and judging whether or not correction on the conversion factor group for adjustment is needed on the basis of a result of the comparison between the measured color data and the target data group; and notifying a user that color measurement is not necessary to be performed except on the second color sample group, or notifying the user that color measurement is necessary to be performed on at least one of the first color sample group and one or a plurality of third color sample groups, on the basis of a result of the judging for the correction of the conversion factor group for adjustment, the one and the plurality of third sample groups each including color samples the number of which is smaller than the number of color samples included in the first color sample group and larger than the number of color samples included in the second color sample group.

12. The non-transitory computer readable medium according to claim 11, further comprising, in a case of judging that the correction of the conversion factor group for adjustment is needed, judging whether to calculate conversion factor groups for respective color components constituting the conversion factor group for adjustment and correct the entire conversion factor group for adjustment by using the conversion factor groups of the respective color components that have been calculated, or to correct the conversion factor group for adjustment so that any one of the entire conversion factor group for adjustment and a part of the conversion factor group for adjustment is newly recreated.

* * * * *